US008411004B2

(12) United States Patent
Iisaka et al.

(10) Patent No.: US 8,411,004 B2
(45) Date of Patent: Apr. 2, 2013

(54) VIDEO PROCESSING CIRCUIT, VIDEO PROCESSING METHOD, LIQUID CRYSTAL DISPLAY DEVICE, AND ELECTRONIC APPARATUS

(75) Inventors: Hidehito Iisaka, Shiojiri (JP); Hiroyuki Hosaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/030,481

(22) Filed: Feb. 18, 2011

(65) Prior Publication Data

US 2011/0205439 A1 Aug. 25, 2011

(30) Foreign Application Priority Data

Feb. 22, 2010 (JP) ................................ 2010-035770

(51) Int. Cl.
*H04N 5/21* (2006.01)

(52) U.S. Cl. ............................... 345/87; 345/88; 345/89

(58) Field of Classification Search .................... 345/87, 345/88–89

See application file for complete search history.

(56) References Cited

U.S. PATENT DOCUMENTS

2009/0153591 A1 * 6/2009 Shin et al. ..................... 345/690
2011/0051006 A1 3/2011 Iisaka et al.

FOREIGN PATENT DOCUMENTS

CN 102005193 A 4/2011
JP A-6-34965 2/1994
JP A-2009-69608 4/2009

* cited by examiner

*Primary Examiner* — Amare Mengistu
*Assistant Examiner* — Shawna Stepp Jones
(74) *Attorney, Agent, or Firm* — Oliff & Berridge, PLC

(57) ABSTRACT

A video processing circuit for a liquid crystal panel, includes: a boundary detecting unit which detects a boundary between a first pixel whose applied voltage specified by an input video signal is below a first voltage and a second pixel whose applied voltage is equal to or higher than a second voltage which is higher than the first voltage; and a correction unit which corrects, for at least two second pixels one of which is adjacent to the boundary detected by the boundary detecting unit on the opposite side of the first pixel and which are successive in a direction opposite to the boundary, an applied voltage to liquid crystal elements corresponding to the second pixels from the applied voltage specified by the video signal to a voltage which is equal to or higher than the first voltage and below the second voltage.

14 Claims, 14 Drawing Sheets

VIDEO SIGNAL (BEFORE CORRECTION)

BOUNDARY DETECTION

CORRECTION PROCESS
(THREE PIXELS AT HIGH POTENTIAL ARE TARGETS)

<NORMALLY BLACK MODE>

WITHOUT CORRECTION PROCESS

WITH CORRECTION PROCESS

VIDEO SIGNAL (BEFORE CORRECTION)

BOUNDARY DETECTION

CORRECTION PROCESS (TWO PIXELS AT HIGH POTENTIAL AND TWO PIXELS AT LOW POTENTIAL ARE TARGETS)

<NORMALLY BLACK MODE>

WITHOUT CORRECTION PROCESS

WITH CORRECTION PROCESS

VIDEO PROCESSING CIRCUIT, VIDEO PROCESSING METHOD, LIQUID CRYSTAL DISPLAY DEVICE, AND ELECTRONIC APPARATUS

BACKGROUND

1. Technical Field

The present invention relates to a technique for reducing display defects in a liquid crystal panel.

2. Related Art

Liquid crystal panels each have a configuration in which liquid crystal is interposed between a pair of substrates with a given gap. Specifically, the liquid crystal panel has pixel electrodes arranged in matrix and each disposed corresponding to each of pixels in one of the substrates and a common electrode disposed in common for the pixels in the other substrate, and the liquid crystal is interposed between the pixel electrodes and the common electrode. When a voltage according to a gray-scale level is applied and held between the pixel electrode and the common electrode, the alignment state of the liquid crystal is defined for each pixel, whereby the transmittance or reflectance is controlled. Accordingly, it can be said in the configuration that only a component in a direction from the pixel electrode toward the common electrode (or the opposite direction) of electric fields acting on liquid crystal molecules, that is, a component in a direction perpendicular to the substrate surface (vertical direction) contributes to display control.

As a pixel pitch is narrowed for miniaturization and higher resolution as in recent years, an electric field generated between pixel electrodes next to each other, that is, an electric field in a direction parallel to the substrate surface (lateral direction) is generated, and the influence thereof is becoming non-negligible. For example, when a lateral electric field is applied to liquid crystal which should be driven by a vertical electric field as in the vertical alignment (VA) mode or the twisted nematic (TN) mode, an alignment defect of liquid crystal (that is, reverse tilt domain) occurs, causing a display defect.

For reducing the influence of the reverse tilt domain, a technique for devising the structure of a liquid crystal panel by, for example, defining the shape of a light shielding layer (an opening) according to a pixel electrode (refer to JP-A-6-34965 (FIG. 1), for example) has been proposed. Moreover, for example, a technique for clipping a video signal having a set value or more, based on the determination that a reverse tilt domain is generated when an average luminance value calculated from a video signal is equal to or less than a threshold value (refer to JP-A-2009-69608 (FIG. 2), for example), has been proposed.

However, the technique for reducing the reverse tilt domains with the structure of the liquid crystal panel has such drawbacks that the aperture ratio is likely t decrease, and that the technique cannot be applied to an existent liquid crystal panel which has been manufactured without devising its structure. On the other hand, the technique for clipping a video signal having a set value or more has such a drawback that the brightness of an image to be displayed is limited to the set value.

SUMMARY

An advantage of some aspects of the invention is to provide a technique for reducing reverse tilt domains while eliminating these drawbacks.

An aspect of the invention is directed to a video processing circuit for a liquid crystal panel including a first substrate in which a pixel electrode is disposed corresponding to each of a plurality of pixels, a second substrate in which a common electrode is disposed, and liquid crystal interposed between the first substrate and the second substrate, the pixel electrode, the liquid crystal, and the common electrode constituting each of liquid crystal elements, the video processing circuit inputting a video signal which specifies an applied voltage to the liquid crystal element for each of the pixels and defining the applied voltage to each of the liquid crystal elements based on a processed video signal, the video processing circuit including: a boundary detecting unit which detects a boundary between a first pixel whose applied voltage specified by an input video signal is below a first voltage and a second pixel whose applied voltage is equal to or higher than a second voltage which is higher than the first voltage; and a correction unit which corrects, for at least two second pixels one of which is adjacent to the boundary detected by the boundary detecting unit on the opposite side of the first pixel and which are successive in a direction opposite to the boundary, an applied voltage to liquid crystal elements corresponding to the second pixels from the applied voltage specified by the video signal to a voltage which is equal to or higher than the first voltage and below the second voltage. According to the aspect of the invention, even when a response time of a liquid crystal element is longer than a time interval to update a display screen, it is possible to suppress the generation of a reverse tilt domain. For example, in a case where the relationship: S<T is satisfied, where S is a time interval to update display of the liquid crystal panel and T is a response time of the liquid crystal element when an applied voltage is switched to a voltage corrected by the correction unit, the number of the second pixels which are next to the first pixel, the first pixel being adjacent to the boundary, on the opposite side of the boundary and are successive in a direction opposite to the boundary may be set to a value of the integer portion of a value obtained by dividing the response time T by the time interval S. Moreover, according to the aspect of the invention, since there is no need to change the structure of a liquid crystal panel, the aperture ratio is not lowered. Moreover, the aspect of the invention can be applied to an existent liquid crystal panel which has been manufactured without devising its structure. Further, since an applied voltage to a liquid crystal element corresponding to the second pixel of neighboring pixels adjacent to the boundaries is corrected from a value corresponding to a gray-scale level specified by a video signal, the brightness of an image to be displayed is not limited to a set value.

In the aspect of the invention, it is preferable that the correction unit corrects, for at least two first pixels one of which is adjacent to the boundary detected by the boundary detecting unit on the opposite side of the second pixel and which are successive in a direction opposite to the boundary, an applied voltage to liquid crystal elements corresponding to the first pixels from the applied voltage specified by the video signal to a voltage which is equal to or higher than the first voltage and below the applied voltage to the liquid crystal elements corresponding to the at least two second pixels. According to the aspect of the invention, the difference between applied voltages to liquid crystal elements corresponding to the first pixel and the second pixel next to each other is further reduced, making it possible to further suppress the generation of a reverse tilt domain.

In the aspect of the invention, it is preferable that the correction unit increases, for at least one third pixel which is next to the at least two first pixels on the opposite side of the boundary, whose applied voltage specified by the video signal is below the first voltage, and which is successive in the direction opposite to the boundary, an applied voltage to a liquid crystal element corresponding to the at least one third pixel so that a difference between the applied voltages to liquid crystal elements corresponding to the third pixel and the first pixel next to each other is reduced. According to the aspect of the invention, it is possible to make unperceivable a boundary between the first pixel and the third pixel, which may be noticeable because the applied voltage to the liquid crystal elements corresponding to the at least two successive first pixels is increased for suppressing the generation of a reverse tilt domain.

In the aspect of the invention, it is preferable that the correction unit decreases, for at least one fourth pixel which is next to the at least two second pixels on the opposite side of the boundary, whose applied voltage specified by the video signal is equal to or higher than the second voltage, and which is successive in the direction opposite to the boundary, an applied voltage to a liquid crystal element corresponding to the at least one fourth pixel so that a difference between the applied voltages to liquid crystal elements corresponding to the fourth pixel and the second pixel next to each other is reduced. According to the aspect of the invention, it is possible to make unperceivable a boundary between the second pixel and the fourth pixel, which may be noticeable because the applied voltage to the liquid crystal elements corresponding to the at least two successive second pixels is increased for suppressing the generation of a reverse tilt domain.

Other aspects of the invention can be conceptualized as, in addition to the video processing circuit, a video processing method, a liquid crystal display device, and an electronic apparatus including the liquid crystal display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

A first embodiment of the invention will be described.

Figure 1:
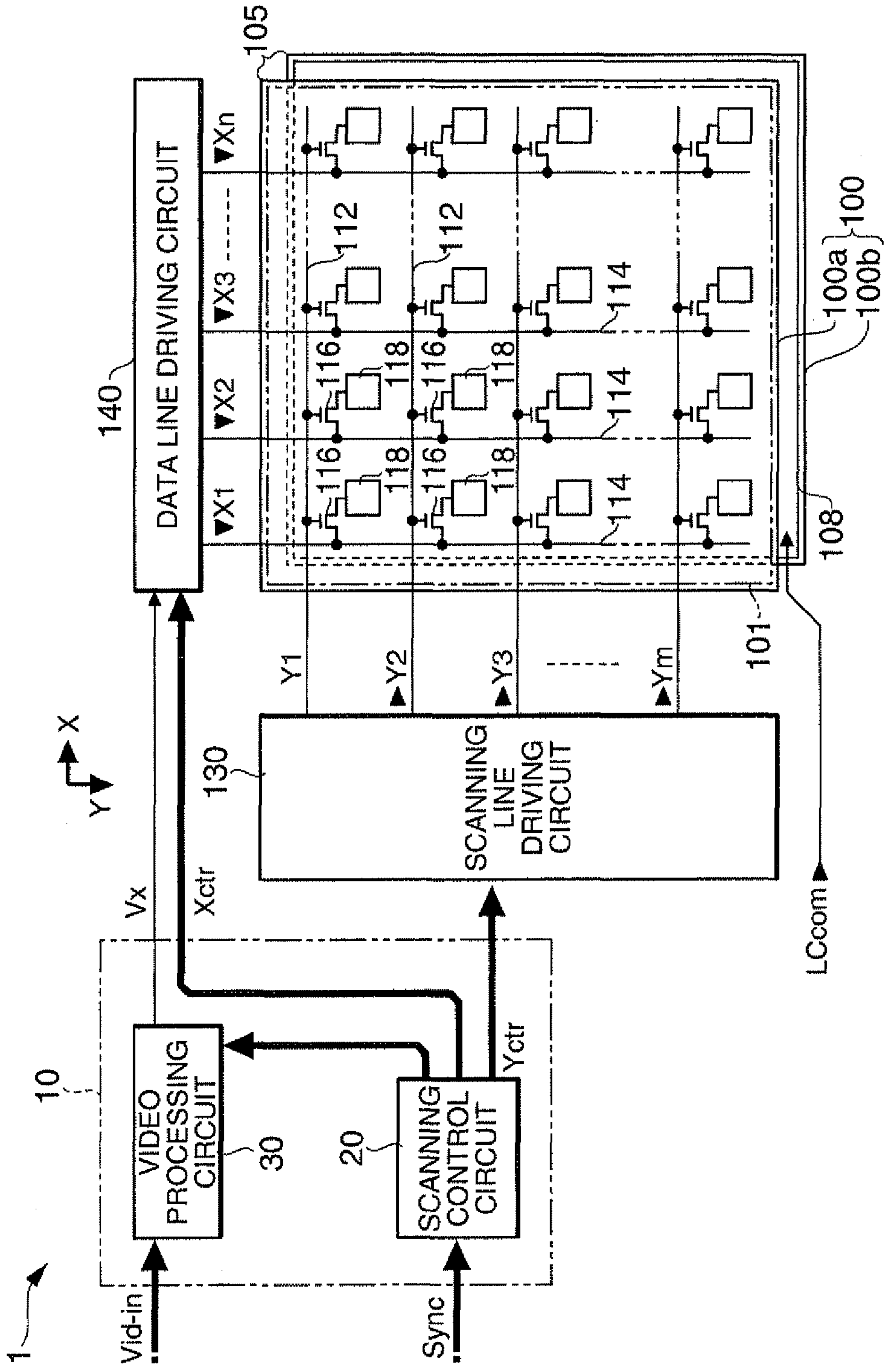
FIG. 1 shows a liquid crystal display device to which a video processing circuit according to a first embodiment of the invention is applied.

FIG. 1 is a block diagram showing the overall configuration of a liquid crystal display device to which a video processing circuit according to the embodiment is applied.

As shown in FIG. 1, the liquid crystal display device 1 has a control circuit 10, a liquid crystal panel 100, a scanning line driving circuit 130, and a data line driving circuit 140. To the control circuit 10, a video signal Vid-in is supplied from a higher-level device in synchronization with a synchronizing signal Sync. The video signal Vid-in is digital data which specifies a gray-scale level of each pixel in the liquid crystal panel 100, and is supplied in a scanning order according to a vertical scanning signal, a horizontal scanning signal, and a dot clock signal (all not shown) included in the synchronizing signal Sync.

Although the video signal Vid-in specifies a gray-scale level, it can safely be said that the video signal Vid-in specifies an applied voltage to a liquid crystal element because the applied voltage to a liquid crystal element is determined according to a gray-scale level.

The control circuit 10 includes a scanning control circuit 20 and a video processing circuit 30. The scanning control circuit 20 generates various kinds of control signals and controls each of the portions in synchronization with the synchronizing signal Sync. The video processing circuit 30, which will be described in detail later, processes the video signal Vid-in in digital form to output an analog data signal Vx.

The liquid crystal panel 100 includes an element substrate (first substrate) 100_a_ and a counter substrate (second substrate) 100_b_ which are bonded together with a given gap and liquid crystal 105 which is interposed in the gap and driven by an electric field in the vertical direction. On a facing surface of the element substrate 100_a_ relative to the counter substrate 100_b_, a plurality of m rows of scanning lines 112 are disposed along the X (lateral) direction in the drawing, and a plurality of n columns of data lines 114 are disposed along the Y (vertical) direction, so as to maintain electrical insulation between the scanning lines 112 and the data lines 114.

In the embodiment, for identifying each of the scanning lines 112, the scanning lines are sometimes referred to as the scanning lines in first, second, third, . . . , (m−1)th, and mth rows in this order from the top in the drawing. Similarly, for identifying each of the data lines 114, the data lines are sometimes referred to as the data lines in first, second, third, (n−1)th, and nth columns in this order from the left in the drawing.

A set of an n-channel TFT 116 and a transparent pixel electrode 118 having a rectangular shape is further disposed in the element substrate 100_a_ so as to correspond to each intersection of the scanning lines 112 and the data lines 114. A gate electrode of the TFT 116 is connected to the scanning line 112, a source electrode thereof is connected to the data line 114, and a drain electrode thereof is connected to the pixel electrode 118. On the other hand, on a facing surface of the counter substrate 100_b_ relative to the element substrate 100_a_, a transparent common electrode 108 is disposed over the entire surface. A voltage LCcom is applied to the common. electrode 108 by a not-shown circuit.

In FIG. 1, since the facing surface of the element substrate 100*a* is on the rear side of the paper, the scanning lines 112, the data lines 114, the TFTs 116, and the pixel electrodes 118 disposed on the facing surface should be indicated by broken lines. However, they are indicated by solid lines to make the drawing easier to read.

Figure 2:
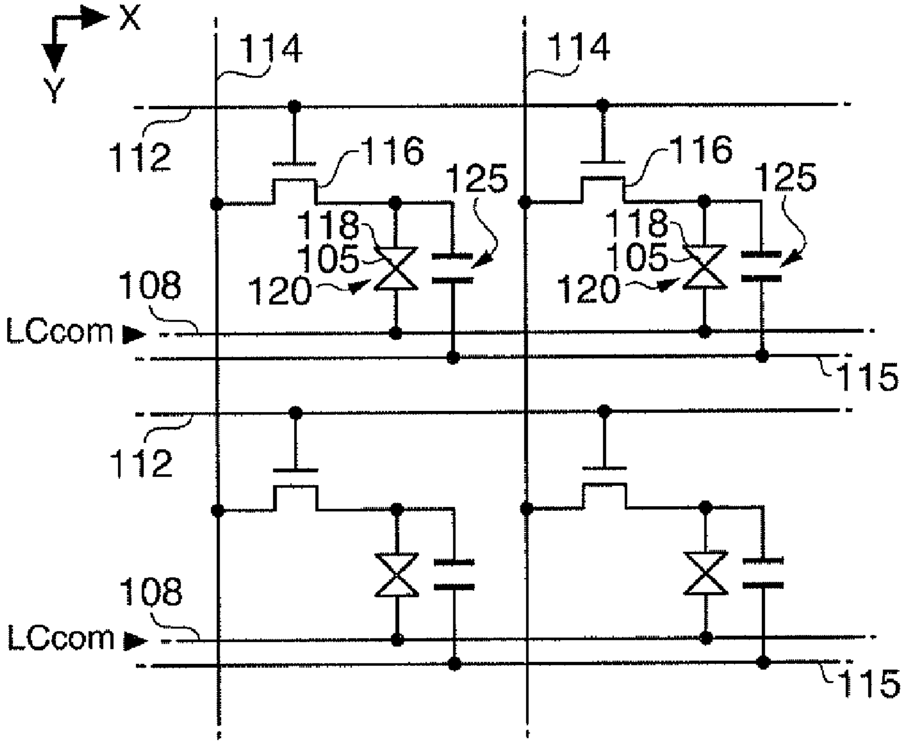
FIG. 2 shows equivalent circuits of liquid crystal elements in the liquid crystal display device.

FIG. 2 shows equivalent circuits in the liquid crystal panel 100.

As shown in FIG. 2, the liquid crystal panel 100 has a configuration in which liquid crystal elements 120 each having the liquid crystal 105 interposed between the pixel electrode 118 and the common electrode 108 are arranged so as to correspond to each of the intersections of the scanning lines 112 and the data lines 114. Although not shown in FIG. 1, an auxiliary capacitor (storage capacitor) 125 is actually disposed in parallel with the liquid crystal element 120 in the equivalent circuit in the liquid crystal panel 100 as shown in FIG. 2. The auxiliary capacitor 125 is connected at one end to the pixel electrode 118 and connected in common at the other end to a capacitor line 115. The capacitor line 115 is held at a constant voltage in terms of time.

In this case, when the scanning line 112 is at H level, the TFT 116 whose gate electrode is connected to that scanning line is turned on, so that the pixel electrode 118 is connected to the data line 114. Therefore, if a data signal of a voltage according to a gray scale is supplied to the data line 114 when the scanning line 112 is at H level, the data signal is applied to the pixel electrode 118 through the TFT 116 in the on state. Although the TFT 116 is turned off when the scanning line 112 is at L level, the voltage applied to the pixel electrode is held by the capacitance of the liquid crystal element 120 and the auxiliary capacitor 125.

In the liquid crystal element 120, the molecule alignment state of the liquid crystal 105 changes depending on an electric field generated by the pixel electrode 118 and the common electrode 108. Therefore, the liquid crystal element 120 has a transmittance according to an applied holding voltage if the liquid crystal element is of transmissive type. Since a transmittance changes in each of the liquid crystal elements 120 in the liquid crystal panel 100, the liquid crystal element 120 corresponds to a pixel. An arrangement region of these pixels serves as a display region 101.

In the embodiment, it is assumed that the liquid crystal 105 is VA-mode liquid crystal, and that the normally black mode is employed in which the liquid crystal element 120 is in a black state when no voltage is applied.

Figure 5A:
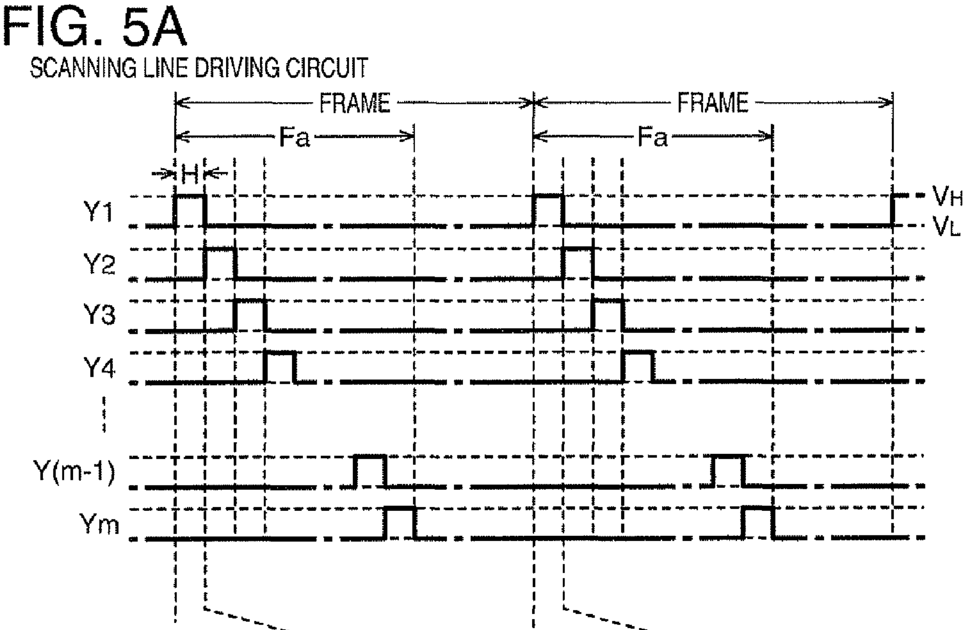
FIGS. 5A and 5B show display operation in the liquid crystal display device.

The scanning line driving circuit 130 supplies scanning signals Y1, Y2, Y3, . . . , and Ym to the scanning lines 112 in the first, second, third, and mth rows according to a control signal Yctr from the scanning control circuit 20. Specifically, the scanning line driving circuit 130 selects the scanning line 112 in the order of the first, second, third, . . . , (m−1)th, and mth rows over a frame as shown in FIG. 5A. Moreover, the scanning line driving circuit 130 sets a scanning signal to the selected scanning line to a selection voltage $V_H$ (H level), and sets a scanning signal to the other scanning lines to a non-selection voltage $V_L$ (L level).

The “frame” used herein means a period required for displaying an image corresponding to a unit of video image by driving the liquid crystal panel 100. When the frequency of the vertical scanning signal included in the synchronizing signal Sync is 60 Hz, the frame is 16.7 milliseconds which is the reciprocal of 60 Hz.

The data line driving circuit 140 samples, as data signals X1 to Xn, the data signal Vx supplied from the video processing circuit 30 for the data lines 114 in the first to nth columns according to a control signal Xctr from the scanning control circuit 20.

As for voltage in the description, a not-shown ground potential serves as the reference of zero voltage, except for the applied voltage to the liquid crystal element 120, unless otherwise specified. This is because the applied voltage to the liquid crystal element 120 is the potential difference between the voltage LCcom of the common electrode 108 and the pixel electrode 118, and therefore, the applied voltage is distinguished from the other voltages.

Figure 4A:
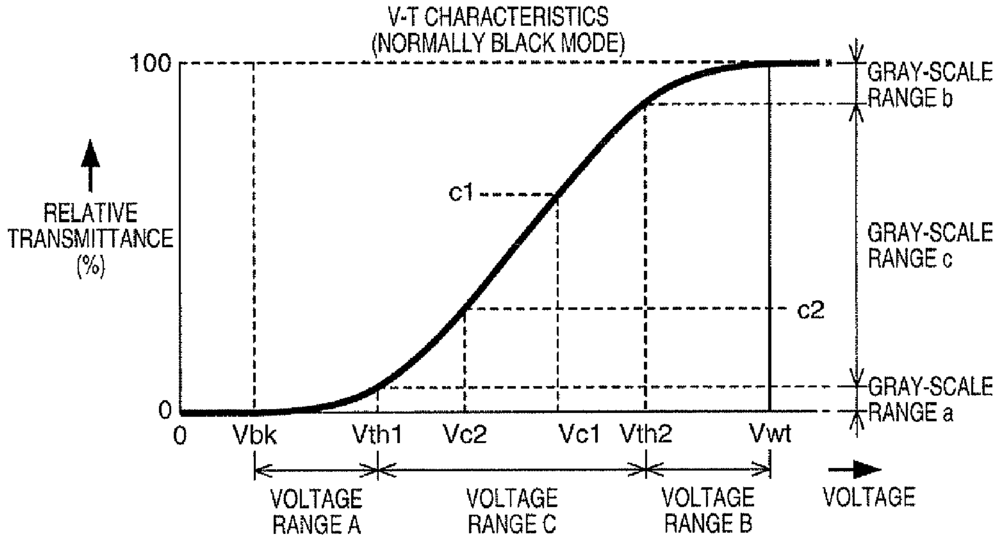
FIGS. 4A and 4B show display characteristics in the liquid crystal display device.

The relationship between the applied voltage to the liquid crystal element 120 and the transmittance thereof is represented by V-T characteristics shown in FIG. 4A when the normally black mode is employed. Therefore, for causing the liquid crystal element 120 to have a transmittance according to a gray-scale level specified by the video signal Vid-in, it should be enough to apply a voltage according to the gray-scale level to the liquid crystal element 120. However, when the applied voltage to the liquid crystal element 120 is simply defined according to the gray-scale level specified by the video signal Vid-in, a display defect caused by a reverse tilt domain sometimes occurs.

As one of the causes of the display defect, it is considered that when liquid crystal molecules interposed in the liquid crystal element 120 are in an unstable state, the liquid crystal molecules are disturbed by the influence of a lateral electric field, and as a result, the liquid crystal molecules are unlikely to go into an alignment state according to the applied voltage thereafter. When the applied voltage to the liquid crystal element 120 is within a voltage range A from a voltage Vbk at black level in the normally black mode to below a threshold value Vth1 (first voltage), an anchoring force caused by a vertical electric field is such an extent that slightly exceeds an anchoring force caused by an alignment film. Therefore, the alignment state of the liquid crystal molecules is likely to be disturbed. This is a state where the liquid crystal molecules are unstable. For convenience, a transmittance range (gray-scale range) of the liquid crystal element whose applied voltage is within the voltage range A is defined as “a”. In the following description, when there is no need to especially identify each gray-scale level in the gray-scale range a, the gray-scale level is represented by “a”, and an applied voltage to a liquid crystal element for obtaining the gray-scale level is sometimes represented by “Va”.

On the other hand, the case where the liquid crystal molecules are affected by the lateral electric field is a case where the potential difference between pixel electrodes next to each other is large, which means a case where a dark pixel at black level or close to black level and a bright pixel at white level or close to white level are next to each other in an image to be displayed. In the normally black mode as shown in FIG. 4A, the dark pixel is the liquid crystal element 120 whose applied voltage is within the voltage range A, and the bright pixel gives a lateral electric field to the dark pixel. For identifying the bright pixel, the bright pixel is defined as the liquid crystal element 120 whose applied voltage is within a voltage range B from a threshold value Vth2 (second voltage) to a voltage Vwt or less at white level in the normally black mode. For convenience, a transmittance range (gray-scale range) of the liquid crystal element 120 whose applied voltage is within the voltage range B is defined as “b”. In the following description, when there is no need to especially identify each gray-scale level in the gray-scale range b, the gray-scale level is represented by “b”, and an applied voltage to the liquid crystal element 120 for obtaining the gray-scale level is sometimes represented by “Vb”.

In the normally black mode, it may be considered that the threshold value Vth1 is an optical threshold voltage causing the relative transmittance of a liquid crystal element to be 10%, while the threshold value Vth2 is an optical saturation voltage causing the relative transmittance of a liquid crystal element to be 90%.

When a liquid crystal element whose applied voltage is within the voltage range A is next to a liquid crystal element within the voltage range B, the liquid crystal element within the voltage range A is subjected to a lateral electric field and is in a situation where a reverse tilt domain is likely to be generated. Conversely, the liquid crystal element within the voltage range B is in a stable state even when the liquid crystal element within the voltage range A is next thereto because the influence of a vertical electric field is dominant. Therefore, a reverse tilt domain is not generated, unlike the liquid crystal element within the voltage range A.

Figure 15:
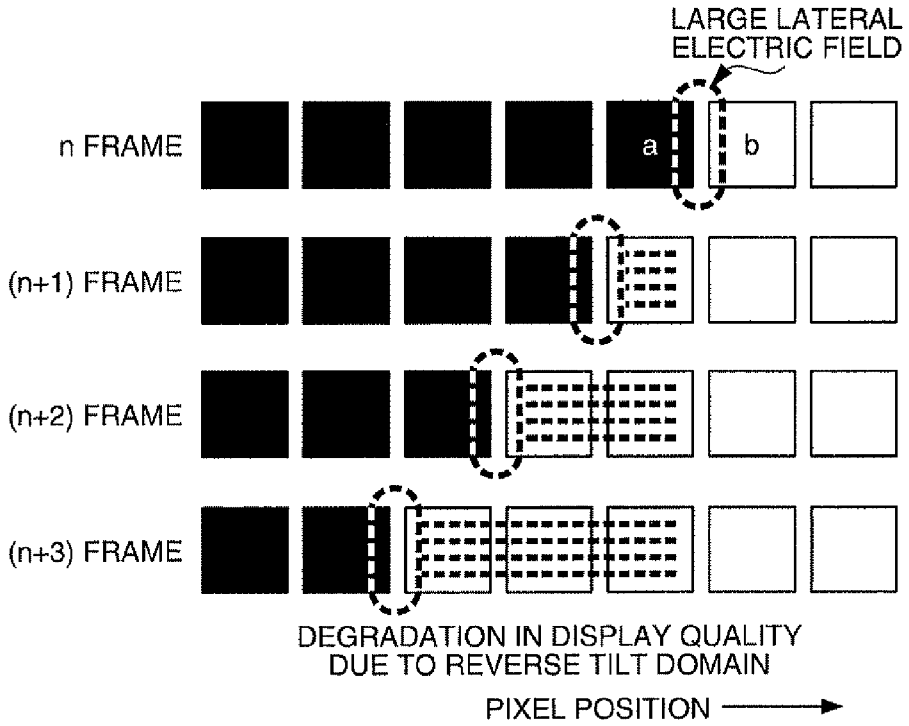
FIG. 15 shows an example of a display defect due to the influence of a lateral electric field.

An example of this display defect will be described. When an image represented by the video signals Vid-in is as shown in FIG. 15 for example, specifically, when dark pixels within the gray-scale range a on a background of bright pixels within the gray-scale range b move in the left direction pixel by pixel every frame, one kind of tailing phenomenon appears, in which the gray scale of a pixel which should be changed from a dark pixel to a bright pixel is not changed to a gray scale within the gray-scale range b because of the generation of a reverse tilt domain. As one of the causes of the phenomenon, it is considered that, when a dark pixel and a bright pixel are next to each other, a lateral electric field between the pixels becomes strong to thereby disturb the alignment of liquid crystal molecules in the dark pixel, and that the region where the alignment is disturbed expands with the movement of the dark pixel.

Accordingly, for suppressing the occurrence of a display defect caused by the disturbed alignment of liquid crystal molecules, it is important to prevent a dark pixel and a bright pixel from being next to each other in the liquid crystal panel 100 even when a dark pixel and a bright pixel are next to each other in the image represented by the video signals Vid-in.

To this end, the video processing circuit 30 disposed before the liquid crystal panel 100 analyzes the image represented by the video signals Vid-in to detect whether or not a state where a dark pixel within the gray-scale range a and a bright pixel within the gray-scale range b are next to each other is present. Then, the video processing circuit 30 corrects, for at least two bright pixels (that is, pixels whose applied voltage should be increased) which includes a bright pixel adjacent to a boundary between a dark pixel and a bright pixel and are successive in a direction opposite to the boundary, the gray-scale level of each of the pixels to a gray-scale level c1 belonging to another gray-scale range c other than the gray-scale range b and the gray-scale range a. The gray-scale range c is a gray-scale level range which exceeds the gray-scale range a and is below the gray-scale range b. Thus, in the liquid crystal panel 100, since a voltage Vc1 corresponding to the gray-scale level c1 is applied to the liquid crystal element 120 corresponding to the bright pixel, a strong lateral electric field is not generated for a pixel (dark pixel in the normally black mode) which is likely to be affected by the lateral electric field.

Figure 3:
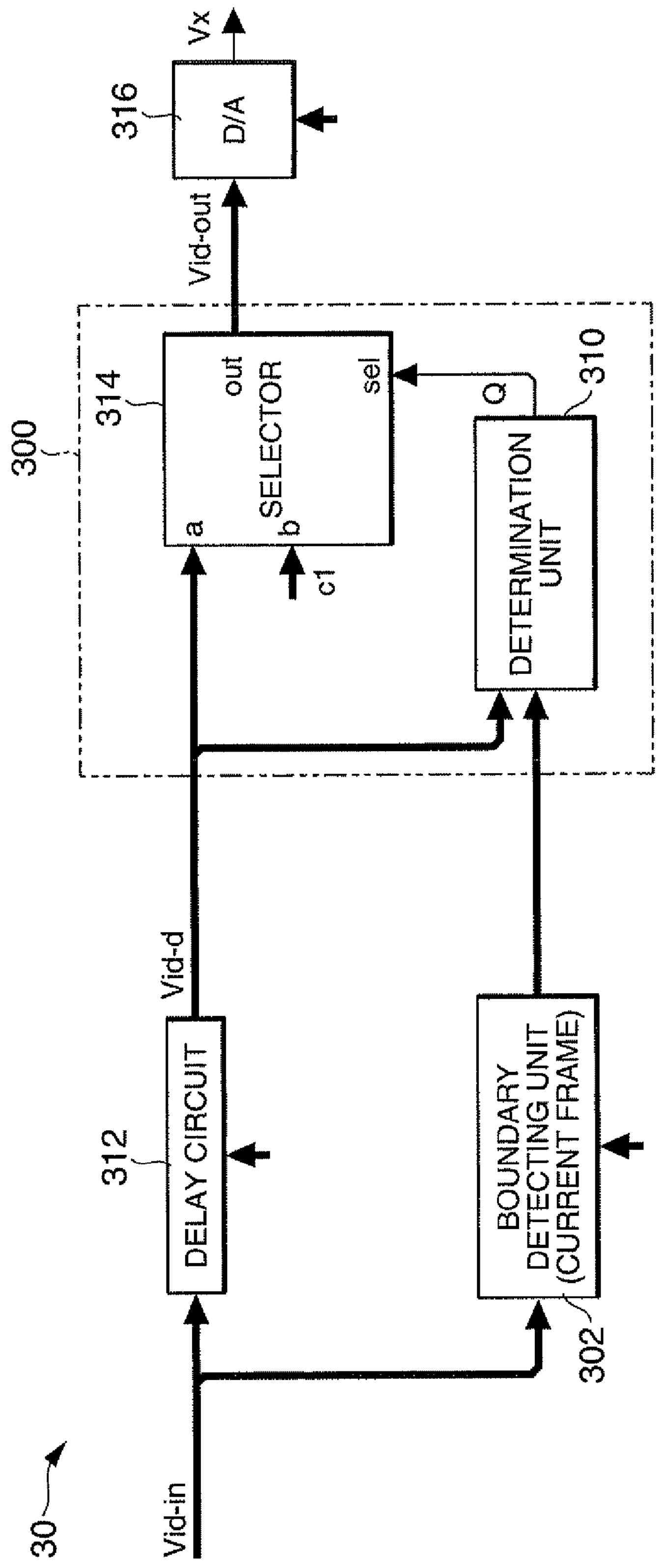
FIG. 3 shows the configuration of the video processing circuit.

Next, the video processing circuit 30 will be described in detail with reference to FIG. 3. As shown in FIG. 3, the video processing circuit 30 includes a correction unit 300, a boundary detecting unit 302, a delay circuit 312, and a D/A converter 316.

The delay circuit 312, which includes a fast-in, fast-out (FIFO) memory and a multistage latch circuit, is configured to accumulate the video signal Vid-in supplied from a higher-level device, read the video signal after the elapse of a predetermined time, and output the video signal as a video signal Vid-d. The accumulation and readout in the delay circuit 312 are controlled by the scanning control circuit 20.

First, the boundary detecting unit 302 analyzes an image represented by the video signals Vid-in to determine whether or not a portion where a pixel within the gray-scale range a (first pixel) and a pixel within the gray-scale range b (second pixel) are next to each other is present. Second, when it is determined that the portion where the pixels are next to each other is present, the boundary detecting unit 302 detects a boundary as the portion where the pixels are next to each other.

The "boundary" used herein means a portion where a pixel within the gray-scale range a and a pixel within the gray-scale range b are next to each other. For example, therefore, a portion where a pixel within the gray-scale range a and a pixel within the gray-scale range c are next to each other, or a portion where a pixel within the gray-scale range b and a pixel within the gray-scale range c are next to each other is not treated as the boundary.

The correction unit 300 includes a determination unit 310 and a selector 314. The determination unit 310 determines whether or not the gray-scale level of a pixel represented by the video signal Vid-d which is delayed by the delay circuit 312 belongs to the gray-scale range b, and whether or not the pixel is adjacent to the boundary detected by the boundary detecting unit 302. If the determined results are both "Yes", the determination unit 310 sets a flag Q of an output signal to "1" and outputs the flag, for example; while setting the flag to "0" and outputting the flag, if either of the determined results is "No". When the determination unit 310 switches the flag Q from "0" to "1" and outputs the flag for a certain bright pixel, the determination unit sets the flag Q to "1" and outputs the flag for at least two subsequent bright pixels. In this case, the determination unit 310 outputs the flag Q "1" for three successive bright pixels.

Since the boundary detecting unit 302 cannot detect a boundary in an image to be displayed unless at least a plurality of lines of video signals have been accumulated, the delay circuit 312 is disposed for adjusting a supply timing of the video signal Vid-in. Therefore, since a timing of the video signal Vid-in supplied from a higher-level device differs from a timing of the video signal Vid-d supplied from the delay circuit 312, their horizontal scanning periods and the like do not coincide with each other in a precise sense. However, the following description will be made without especially distinguishing between them.

The selector 314 selects either an input end a or an input end b according to the flag Q supplied to a control terminal Se1, and outputs a signal supplied to the selected input end from an output end out as a video signal Vid-out. In the selector 314, the video signal Vid-d from the delay circuit 312 is supplied to the input end a, and a video signal at the gray-scale level c1 is supplied as a signal for correction to the input end b. If the flag Q supplied to the control terminal Se1 is "1", the selector 314 selects the input end b; while if the flag Q is "0", the selector 314 selects the input end a, so that a video signal input to either one of them is output as the video signal Vid-out.

The D/A converter 316 converts the video signal Vid-out as digital data into the analog data signal Vx. For preventing the application of DC component to the liquid crystal 105, the voltage of the data signal Vx is alternately switched between a positive voltage on the high-potential side and a negative voltage on the low-potential side, relative to a voltage Vc as the video amplitude center, from frame to frame, for example.

It may be considered that the voltage LCcom to be applied to the common electrode 108 is substantially the same voltage as the voltage Vc. However, the voltage LCcom is sometimes adjusted so as to be lower than the voltage Vc in view of the off-leak of the n-channel TFT 116 and the like.

A case where the flag Q is "1" means that a reverse tilt domain is likely to be generated because a bright pixel adjacent to a boundary on the opposite side to a dark pixel causes a lateral electric field, and the lateral electric field affects the dark pixel. If the flag Q is "1", the selector 314 selects the input end b. Therefore, the video signal Vid-d which specifies a gray-scale level within the gray-scale range b is corrected to a video signal which specifies the gray-scale level c1 and is then output as the video signal Vid-out. On the other hand, if the flag Q is "0", the input end a is selected in the selector 314. Therefore, the delayed video signal Vid-d is output as the video signal Vid-out.

Display operation of the liquid crystal display device 1 will now be described. From a higher-level device, the video signal Vid-in is supplied over a frame in the pixel order of from the first row, first column to the first row, nth column, from the second row, first column to the second row, nth column, from the third row, first column to the third row, nth column, . . . , and from the mth row, first column to the mth row, nth column. The video processing circuit 30 performs processing such as delay or replacement on the video signal Vid-in to output the video signal as the video signal Vid-out.

Figure 5B:
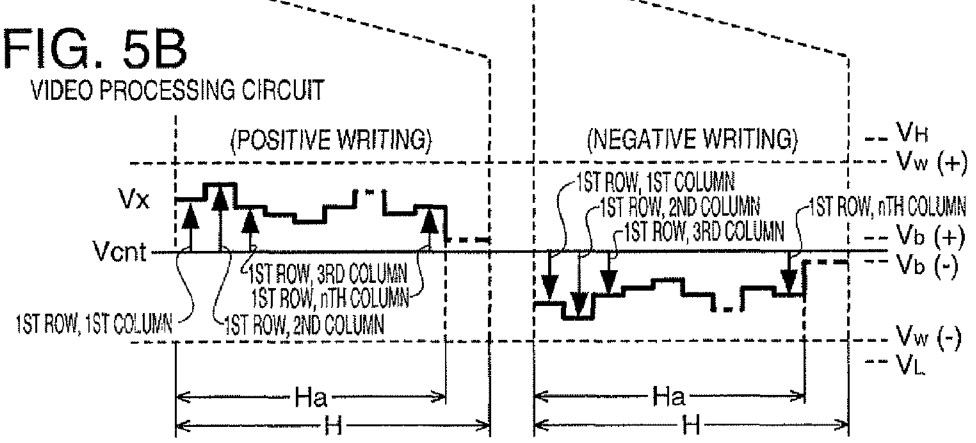

In view of a horizontal effective scanning period (Ha) in which the video signals Vid-out for the first row, first column to the first row, nth column are output, the processed video signal Vid-out is converted into, by the D/A converter 316 as shown in FIG. 5B, the positive or negative data signal Vx, for example, into the positive data signal in this case. The data signal Vx is sampled by the data line driving circuit 140 for the data lines 114 in the first to nth columns as the data signals X1 to Xn.

On the other hand, in a horizontal scanning period in which the video signals Vid-out for the first row, first column to the first row, nth column are output, the scanning control circuit 20 controls the scanning line driving circuit 130 so that only the scanning signal Y1 goes to H level. When the scanning signal Y1 is at H level, the TFTs 116 in the first row are turned on, and therefore, the data signal sampled for the data line 114 is applied to the pixel electrodes 118 through the TFTs 116 in the on state. Thus, a positive voltage according to a gray-scale level specified by the video signal Vid-out is written to each of liquid crystal elements in the first row, first column to the first row, nth column.

Consequently, the video signals Vid-in for the second row, first column to the second row, nth column are processed similarly by the video processing circuit 30 and output as the video signals Vid-out. In addition, the video signals Vid-out are converted into positive data signals by the D/A converter 316 and then sampled by the data line driving circuit 140 for the data lines 114 in the first to nth columns.

In a horizontal scanning period in which the video signals Vid-out for the second row, first column to the second row, nth column are output, since only the scanning signal Y2 goes to H level by the scanning line driving circuit 130, the data signal sampled for the data line 114 is applied to the pixel electrodes 118 through the TFTs 116 in the second row in the on state. Thus, a positive voltage according to a gray-scale level specified by the video signal Vid-out is written to each of liquid crystal elements in the second row, first column to the second row, nth column.

Thereafter, similar writing operation is executed on the third, fourth, and mth rows. Thus, a voltage according to a gray-scale level specified by the video signal Vid-out is written to each of liquid crystal elements, so that a transmission image defined by the video signals Vid-in is produced. In the next frame, similar writing operation is executed except that the video signal Vid-out is converted into a negative data signal due to the polarity inversion of data signal.

FIG. 5B is a voltage waveform diagram showing an example of the data signal Vx when the video signals Vid-out for the first row, first column to the first row, nth column are output over a horizontal scanning period (H) from the video processing circuit 30. Since the normally black mode is employed in the embodiment, the data signal Vx, if positive, becomes a voltage on the high-potential side (indicated by ↑ in the drawing) by an amount corresponding to the gray-scale level processed by the video processing circuit 30, relative to the reference voltage Vcnt. If negative, the data signal Vx becomes a voltage on the low-potential side (indicated by ↓ in the drawing) by an amount corresponding to the gray-scale level, relative to the reference voltage Vcnt. Specifically, if positive, the voltage of the data signal Vx becomes a voltage shifted from the reference voltage Vcnt by an amount corresponding to the gray-scale level in a range from a voltage Vw(+) corresponding to white to a voltage Vb(+) corresponding to black; while if negative, the voltage becomes a voltage shifted from the reference voltage Vcnt by an amount corresponding to the gray-scale level in a range from a voltage Vw(−) corresponding to white to a voltage Vb(−) corresponding to black. The voltages Vw(+) and Vw(−) are symmetrical about the voltage Vcnt. The voltages Vb(+) and Vb(−) are also symmetrical about the voltage Vcnt.

FIG. 5B shows the voltage waveform of the data signal Vx, which differs from a voltage (the potential difference between the pixel electrode 118 and the common electrode 108) to be applied to the liquid crystal element 120. The vertical scale of the voltage of the data signal in FIG. 5B is enlarged compared to the voltage waveforms of the scanning signals and the like in FIG. 5A.

Next, a specific example of processing by the video processing circuit 30 will be described.

Figure 6A:
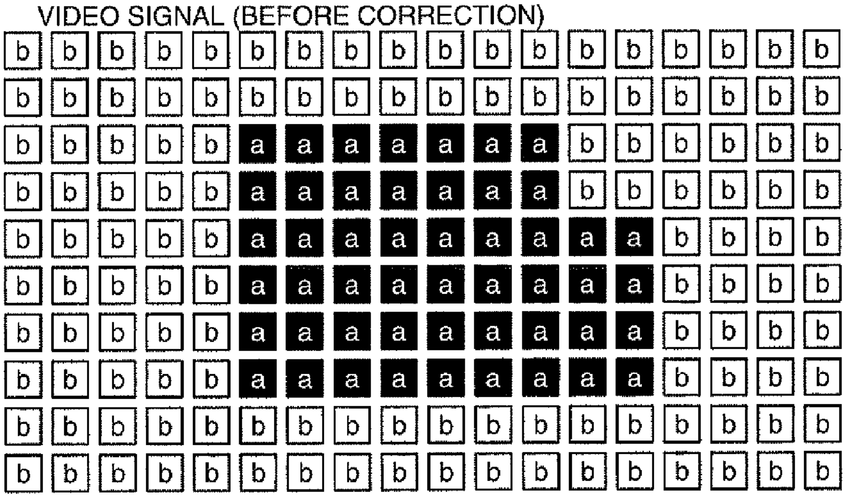
FIGS. 6A to 6C show the contents of a correction process in the video processing circuit.
Figure 6B:
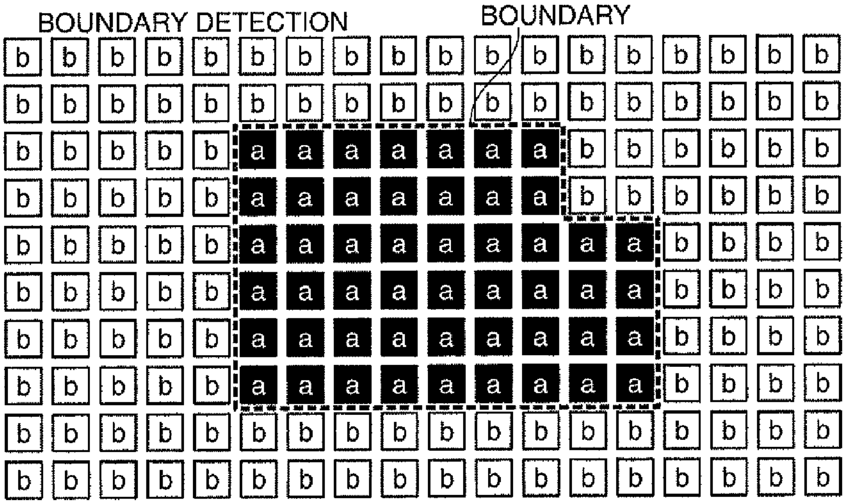

When an image represented by the video signals Vid-in is as shown in, for example, FIG. 6A, boundaries detected by the boundary detecting unit 302 are as shown in FIG. 6B.

In the video processing circuit 30, at least two bright pixels one of which is adjacent to the detected boundary, whose gray-scale levels belong to the gray-scale range b, and which are successive in a direction opposite to the boundary are defined as a correction target. Hereinafter, the bright pixel group as the correction target is referred to as "correction-target bright pixel group". In this case, for each pixel of the correction-target bright pixel group, a video signal is corrected to one at the gray-scale level c1. In this case, the correction-target bright pixel group is composed of three successive bright pixels. The gray-scale level c1 may be obtained by any applied voltage which is equal to or higher than the threshold value Vth1 and is below the threshold value Vth2. However, a change in brightness is preferably within 10% of a brightness obtained when this correction is not made.

Figure 6C:
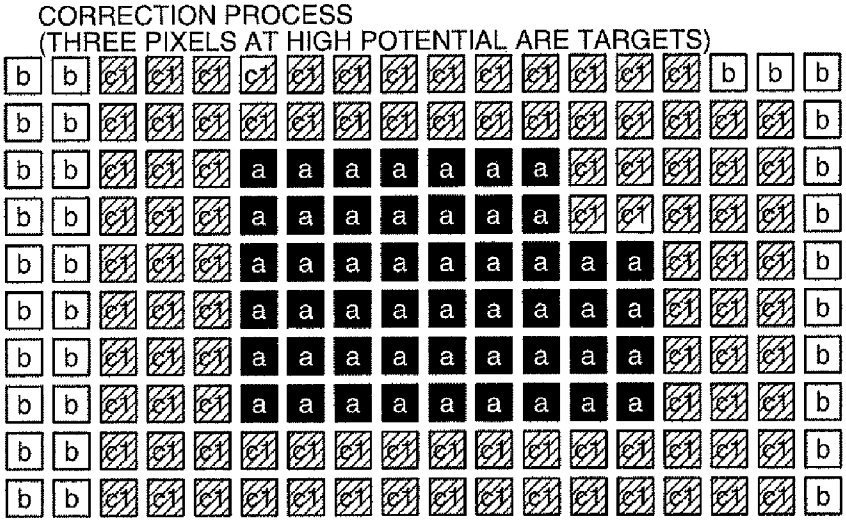

With the processing described above by the video processing circuit 30, the image shown in FIG. 6A is corrected to an image having gray-scale levels shown in FIG. 6C.

Figure 7A:
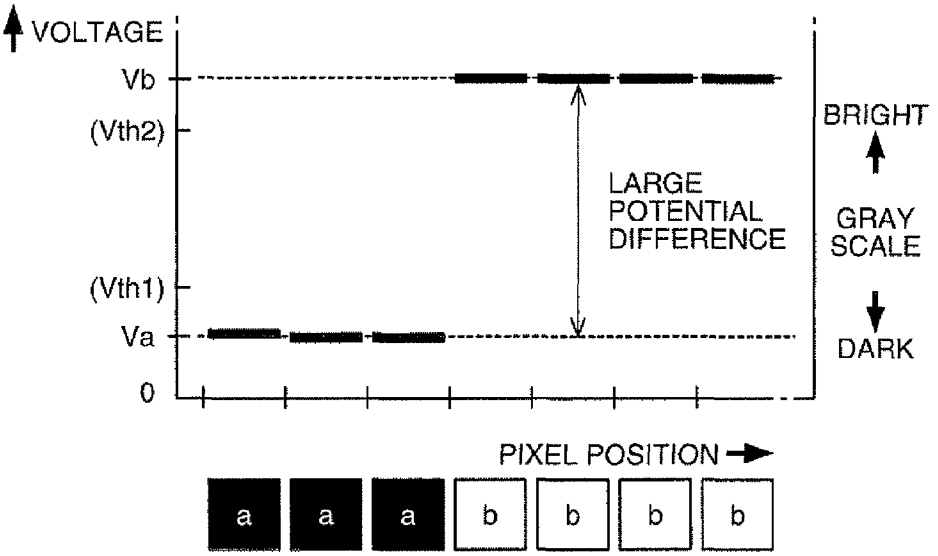
FIGS. 7A and 7B show a reduction in lateral electric field through the correction process.

If it is assumed that the video signal Vid-in is supplied to the liquid crystal panel 100 without processing by the video processing circuit 30, the potentials of pixel electrodes are as shown in, for example, FIG. 7A when positive writing. That is, the potential of a pixel electrode of a dark pixel is lower than that of a pixel electrode of a bright pixel when positive writing. However, since the potential difference therebetween is large, the pixel is likely to be affected by a lateral electric field. When negative writing, on the other hand, the potentials are symmetrical about the voltage Vc (substantially equal to the voltage LCcom), and the potential level relationship is reversed. However, since the potential difference is still large, the pixel is likely to be affected by a lateral electric field.

Figure 7B:
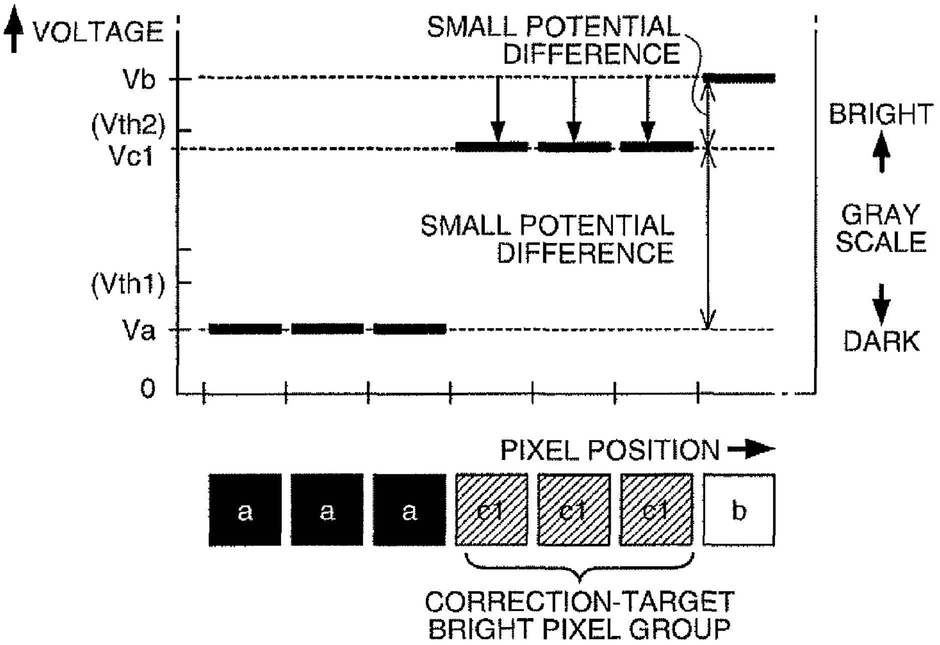

Contrary to this, according to the configuration of the video processing circuit 30, when the display of FIG. 7A is specified by the video signals Vid-in, the potential of pixel electrodes is lowered as shown in FIG. 7B. Thus, since the potential difference between pixel electrodes changes in a stepwise manner, the influence of a lateral electric field can be suppressed. Thus, even when dark pixels within the gray-scale range a on a background of bright pixels within the gray-scale range b move in the left direction every frame, the occurrence of the tailing phenomenon shown in FIG. 15 is not noticeable because the generation of a reverse tilt domain is suppressed.

Here, a time interval to update the display screen of the liquid crystal panel 100 is defined as S (millisecond), and a response time until the alignment state of the liquid crystal element 120 is changed to an alignment state obtained when an applied voltage of each pixel of the correction-target bright pixel group is corrected and switched to the voltage Vc1 by the correction unit 300 is defined as T (millisecond). For example, when the liquid crystal panel 100 is driven at single speed, the time interval S is 16.7 milliseconds, which is equal to a frame. Therefore, when the relationship: $S(=16.7)\geqq T$ is satisfied, it is sufficient that the gray-scale level of only one bright pixel which is adjacent to the boundary is corrected to the gray-scale level c1. In recent years, on the other hand, the driving speed of the liquid crystal panel 100 tends to be higher, such as double speed or quad speed. Even with such a high-speed driving, the video signals Vid-in supplied from a higher-level device correspond to a unit of video image every frame, in the same manner as in the case of single-speed driving. Therefore, between an n frame and an (n+1) frame, an intermediate image between them is produced by an interpolation technique or the like to be displayed on the liquid crystal panel 100 for improving moving image display viewing characteristics or the like in some cases. For example, in the case of double-speed driving, the time interval to update the display screen is reduced to half, i.e., 8.35 (millisecond). Therefore, each frame is divided into two fields, a first field and a second field. In the first field, for example, an update is made so that an image of its own frame is displayed, and in the second field, an update is made so that an interpolation image corresponding to the image of its own frame and an image of a subsequent frame is displayed. Accordingly, in the case of high-speed driving, an image pattern may move pixel by pixel in a field obtained by dividing the frame.

When a time of a frame during which the video signals Vid-in corresponding to a unit of video image are supplied is defined as F (millisecond), and a liquid crystal panel is driven at U--time speed (U is an integer), a time of one field is a value obtained by dividing F by U, which is the time interval S to update the display screen.

For example, therefore, when the liquid crystal panel 100 is driven at double speed relative to the video signal Vid-in supplied with a frame of 16.7 milliseconds, the time interval S to update the display screen is 8.35 milliseconds, which is half the frame. Here, if it is assumed that the response time T is 24 milliseconds, the preferable number of pixels as the correction-target bright pixel group is obtained as follows: "24" divided by "8.35" is "2.874 . . . "; and "1" is added to the integer portion "2" of "2.874 . . . ", which results in "3". In this manner, when the relationship: $S<T$ is satisfied, the number of pixels of the correction-target bright pixel group may be set to a value of the integer portion of a value obtained by dividing the response time T by the time interval S, as a minimum number. According to the configuration, even when the response time of a liquid crystal element is longer than the time interval to update the display screen, such as the case of driving the liquid crystal panel 100 at double speed, the occurrence of a display defect caused by the reverse tilt domain can be prevented in advance by appropriately setting the number of pixels of the correction-target bright pixel group.

Since the gray-scale level of pixels in the vicinity of the boundary is corrected locally in an image defined by the video signals Vid-in, a user is not likely to perceive a change in the display image due to the correction. Moreover, since there is no need to change the configuration of the liquid crystal panel 100, the aperture ratio is not lowered, and the embodiment can be applied to an existent liquid crystal panel which has been manufactured without devising its structure.

In the embodiment, the case where the VA-mode liquid crystal 105 and the normally black mode are employed has been described. However, the normally white mode where the liquid crystal element 120 is in a white state when no voltage is applied may be employed with TN-mode liquid crystal 105, for example. When the normally white mode is employed, the relationship between the applied voltage and transmittance of the liquid crystal element 120 is represented by V-T characteristics shown in, for example, FIG. 4B, in which the transmittance decreases as the applied voltage increases. Similarly to the normally black mode, a pixel affected by a lateral electric field is a pixel whose applied voltage is lower. However, in the normally white mode, the pixel whose applied voltage is lower is a bright pixel. Therefore, in the normally white mode, the video processing circuit corrects the gray-scale level of a dark pixel group specified by the video signal Vid-in to the gray-scale level c1 under a situation where a bright pixel (first pixel) whose transmittance is higher than that obtained when an applied voltage is the threshold value Vth1 and a dark pixel (second pixel) whose transmittance is equal to or less than that obtained when an applied voltage is the threshold value Vth2 are next to each other.

Also in the normally white mode, the configuration is not limited to a case where the gray-scale level of three successive dark pixels is corrected to the gray-scale level c1. The number of pixels may be further increased in view of the response time of the liquid crystal element 120, the driving speed of the liquid crystal panel 100, and the like.

Second Embodiment

Next, a second embodiment of the invention will be described.

In the following description, the same components as those of the first embodiment are denoted by the same reference numerals, and the description thereof is appropriately omitted.

In the first embodiment, by analyzing the video signal Vid-in, when a dark pixel and a bright pixel are next to each other, the gray-scale level of a pixel group whose applied voltage is higher is corrected. Contrary to this, for further reducing a lateral electric field, an applied voltage to a pixel whose applied voltage is lower, that is, a pixel which is likely to be affected by an electric field (dark pixel in the normally black mode), may be increased.

Figure 8:
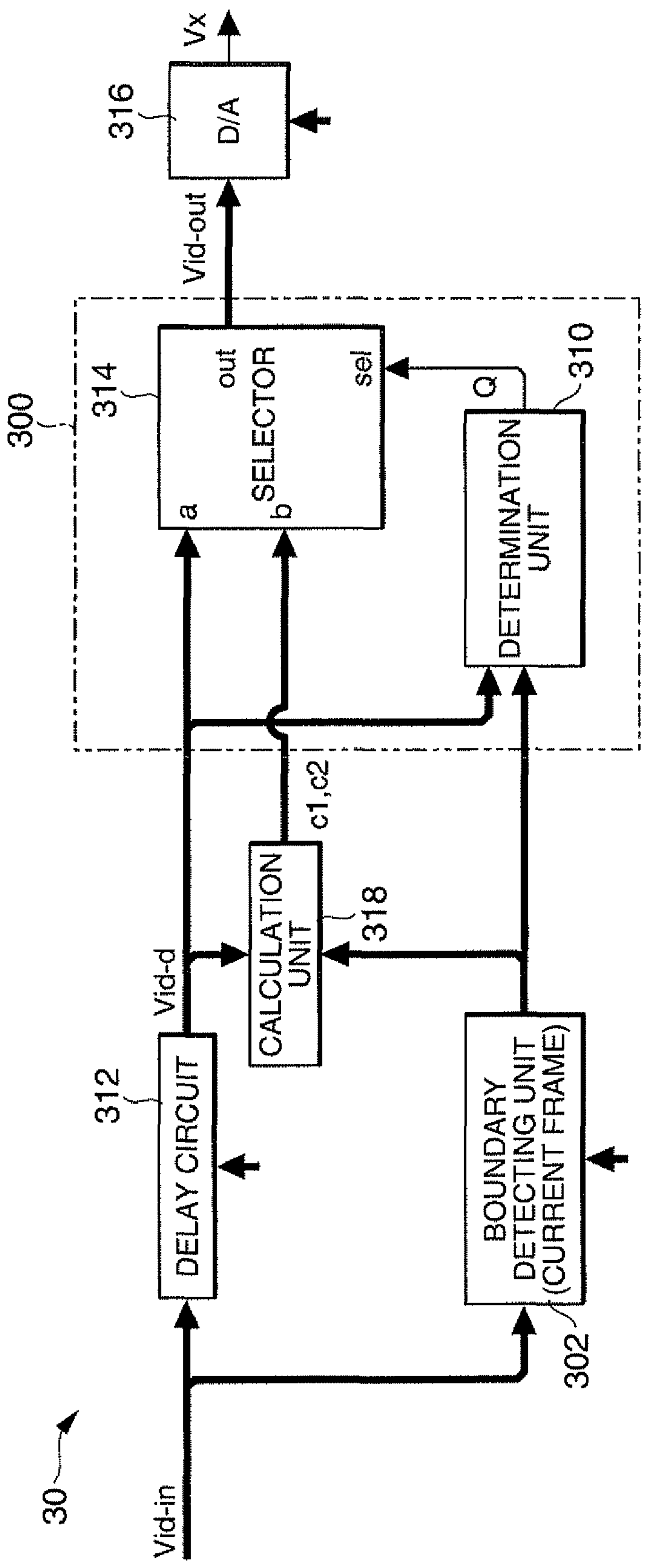
FIG. 8 shows the configuration of a video processing circuit according to a second embodiment of the invention.

FIG. 8 is a block diagram showing the configuration of the video processing circuit 30 according to the second embodiment.

The configuration of the video processing circuit 30 of the second embodiment differs from that of the first embodiment in that a calculation unit 318 is added, and that the determination contents of the determination unit 310 are changed.

The normally black mode will be exemplified. If the gray-scale level of a pixel represented by the video signal Vid-d which is delayed by the delay circuit 312 is that of a bright pixel belonging to the gray-scale range b, the calculation unit 318 outputs the gray-scale level c1; while the gray-scale level is that of a dark pixel belonging to the gray-scale range a, the calculation unit 318, outputs a gray-scale level c2.

First, the determination unit 310 determines whether or not a gray-scale level of a pixel represented by the video signal Vid-d which is delayed by the delay circuit 312 belongs to the gray-scale range b, and whether or not the pixel is adjacent to the boundary detected by the boundary detecting unit 302. If the determined results are both “Yes”, the determination unit 310 sets the flag Q of an output signal to “1” and outputs the flag, for example; while setting the flag to “0” and outputting the flag, if either of the determined results is “No”. When the determination unit 310 switches the flag Q from “0” to “1” and outputs the flag for a certain bright pixel, the determination unit 310 sets the flag Q to “1” and outputs the flag for at least two bright pixels which are successive on the opposite side to the detected boundary. In this case, the determination unit 310 sets the flag Q to “1” and outputs the flag for two successive bright pixels. Second, the determination unit 310 determines whether or not the gray-scale level of a pixel represented by the video signal Vid-d which is delayed by the delay circuit 312 belongs to the gray-scale range a, and whether or not the pixel is adjacent to the boundary detected by the boundary detecting unit 302. If the determined results are both “Yes”, the determination unit 310 sets the flag Q of an output signal to “1” and outputs the flag, for example; while setting the flag to “0” and outputting the flag, if either of the determined results is “No”. When the determination unit 310 switches the flag Q from “0” to “1” and outputs the flag for a certain dark pixel, the determination unit 310 sets the flag Q to “1” and outputs the flag for at least two dark pixels which are successive on the opposite side to the detected boundary. In this case, the determination unit 310 sets the flag Q to “1” and outputs the flag for two successive dark pixels.

If the flag Q output from the determination unit 310 is “1”, the video signal Vid-d is corrected to a gray-scale level output from the calculation unit 318, and is output as the video signal Vid-out.

A specific example of processing by the video processing circuit 30 will be described.

Figure 9A:
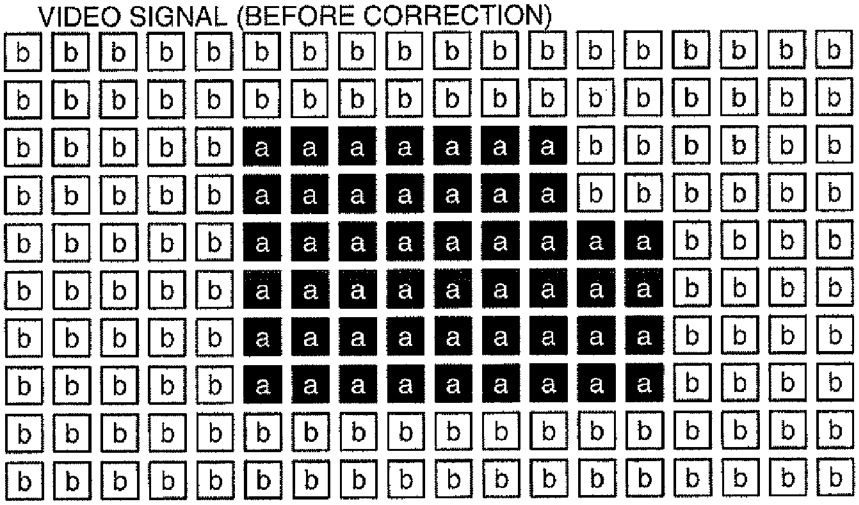
FIGS. 9A to 9C show the contents of a correction process in the video processing circuit.
Figure 9B:
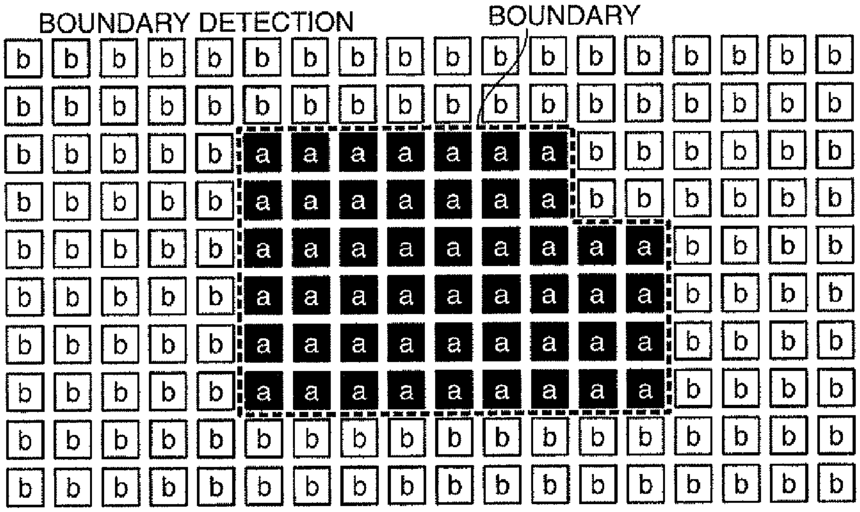
Figure 9C:
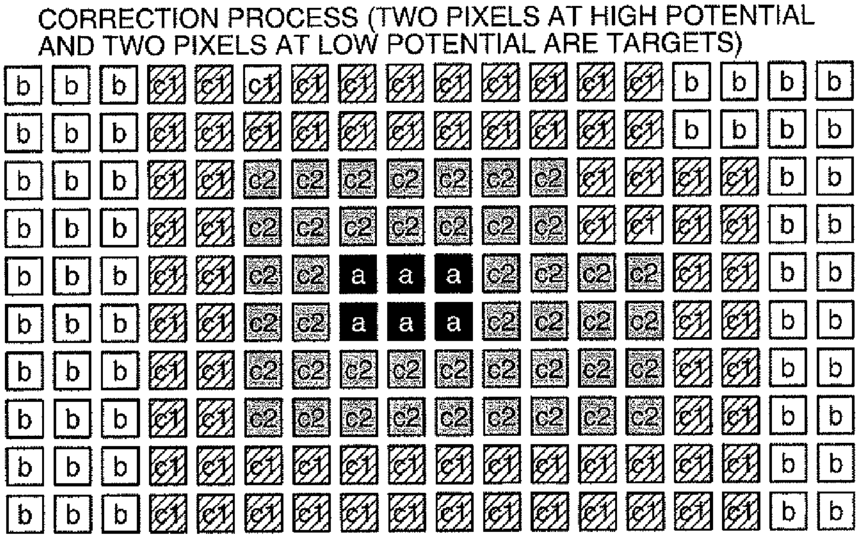

When an image represented by the video signals Vid-in is as shown in, for example, FIG. 9A, boundaries detected by the boundary detecting unit 302 are as shown in FIG. 9B.

Figure 4B:
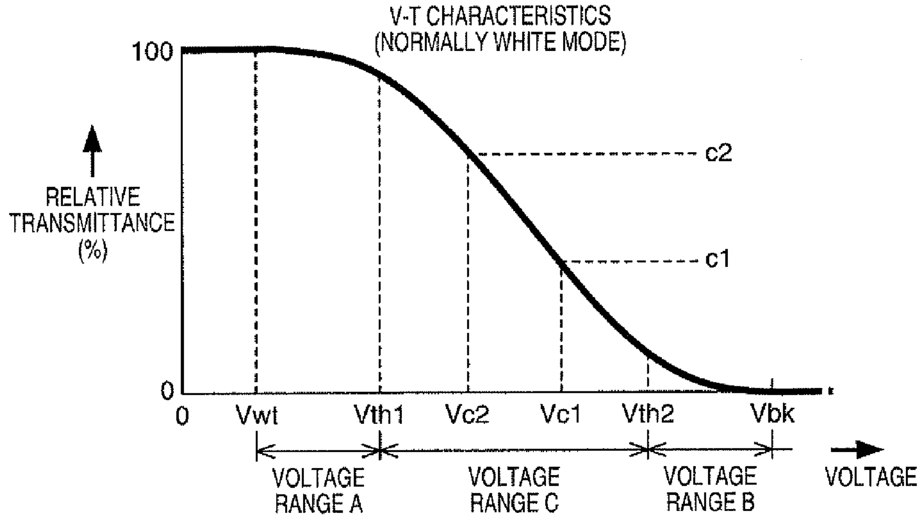

In the video processing circuit 30, a correction-target bright pixel group including at least two bright pixels is corrected to the gray-scale level c1 by the same procedure as that of the first embodiment; while, for a dark pixel group (hereinafter referred to as “correction-target dark pixel group”) in which at least two dark pixels are successive and which is adjacent to the detected boundary on the opposite side of the correction-target bright pixel group, a video signal is corrected to one at the gray-scale level c2. In this case, the correction-target dark pixel group is composed of two successive dark pixels. The gray-scale level c2 is obtained by any applied voltage which is equal to or higher than the threshold value Vth1 and below the voltage Vol. That is, as shown in FIGS. 4A and 4B, the gray-scale level c2 is a gray-scale level belonging to the gray-scale range c and is a gray-scale level below the gray-scale level c1.

Figure 10A:
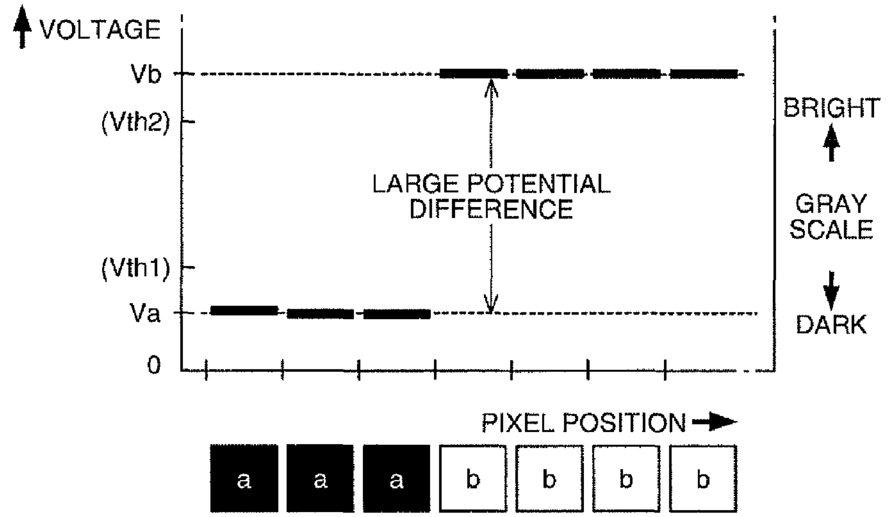
FIGS. 10A and 10B show a reduction in lateral electric field through the correction process.
Figure 10B:
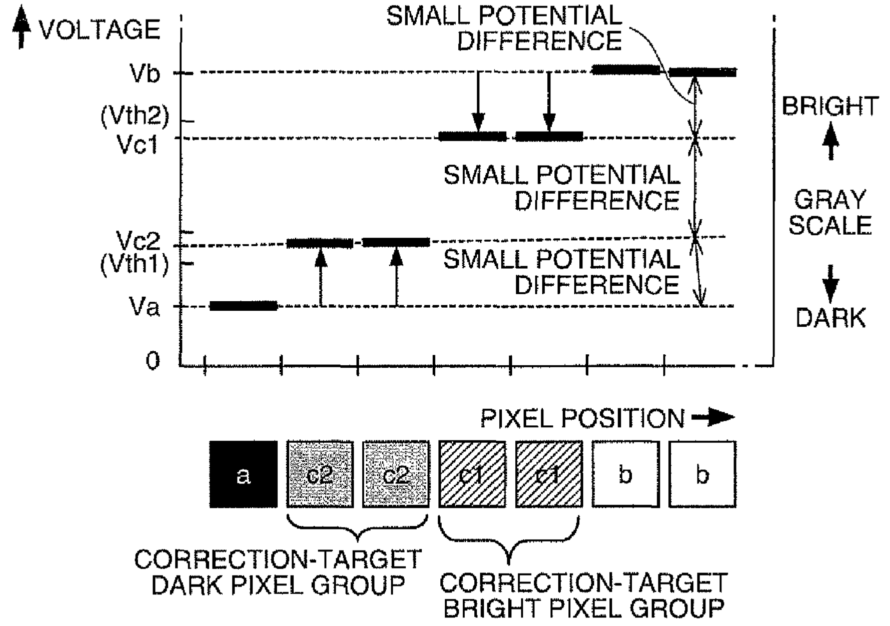

If it is assumed that the video signal Vid-in is supplied to the liquid crystal panel 100 without processing by the video processing circuit 30, the potentials of pixel electrodes in dark pixels belonging to the gray-scale range a and bright pixels belonging to the gray-scale range b are as shown in FIG. 10A when positive writing, in which a lateral electric field between a dark pixel and a bright pixel is large. Contrary to this in the embodiment, as shown in FIG. 10B, since an applied voltage to liquid crystal elements of the dark pixel group is corrected to be increased, the potential difference between pixels close to each other can be further reduced. Therefore, it is possible to suppress the influence of a lateral electric field more than in the configuration of the first embodiment. In the second embodiment, gray-scale levels are replaced for a pixel group (four pixels) composed of dark pixels and bright pixels next to each other with the boundary interposed therebetween. Accordingly, even when the response time of a liquid crystal element is longer than the time interval to update the display screen, such as the case of driving the liquid crystal panel 100 at double speed, the occurrence of the display defect caused by the reverse tilt domain can be prevented in advance.

In this case, although each of the correction-target dark pixel group and the correction-target bright pixel group is defined as two successive pixels, the number of pixels is not limited to two. The number of pixels may be further increased in view of the response time of the liquid crystal element 120, the driving speed of the liquid crystal panel 100, and the like.

Also in the second embodiment, the normally white mode where the liquid crystal element 120 is in a white state when no voltage is applied may be employed with the TN-mode liquid crystal 105, for example. When the normally white mode is employed, the video processing circuit 30 corrects the gray-scale level of each pixel under a situation where a bright pixel whose transmittance is higher than that obtained when an applied voltage is the threshold value Vth1 and a dark pixel whose transmittance is equal to or less than that obtained when an applied voltage is the threshold value Vth2 are next to each other.

Third Embodiment

Next, a third embodiment of the invention will be described.

In the following description, the same components as those of the first and second embodiments are denoted by the same reference numerals, and the detailed description thereof is appropriately omitted.

A specific example of a correction process by the video processing circuit 30 of the third embodiment will be described with reference to FIGS. 11A to 13B. In each of FIGS. 11A to 13B, each rectangle corresponds to one pixel, and an alphabet or a combination of alphabet and numerical value, shown inside the rectangle, corresponds to each gray-scale level. P1 to P12 are reference numerals for identifying respective pixels, and the numeric suffix is incremented from the left to the right in the drawing. In the graph below the rectangles, the horizontal axis represents the position of each pixel, while the vertical axis represents an applied voltage to a liquid crystal element corresponding to a pixel at each pixel position.

Figure 11A:
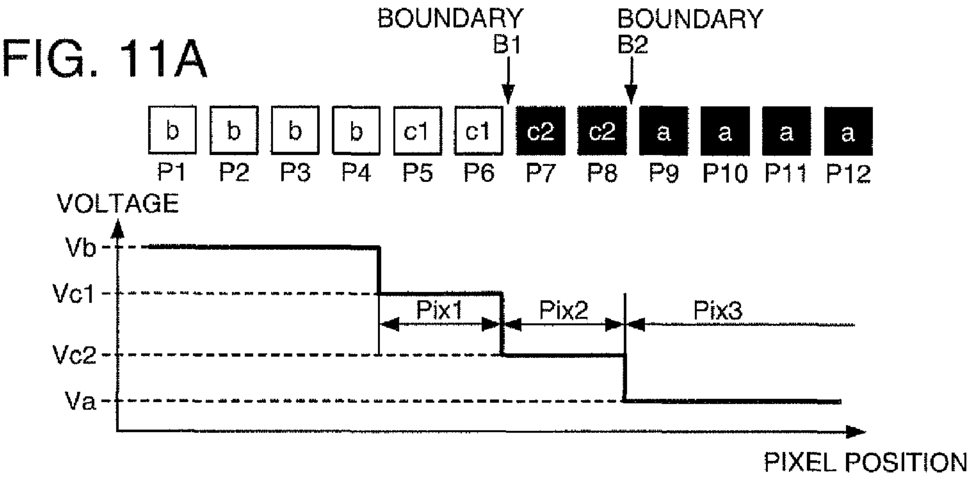
FIGS. 11A to 11C show the contents of a boundary correction in a video processing circuit according to a third embodiment of the invention.

Here, a case is considered in which an image whose gray-scale level is corrected by the configuration of the second embodiment is as shown in FIG. 11A. In this case, a correction-target bright pixel group Pix1 at the gray-scale level c1 and a correction-target dark pixel group Pix2 at the gray-scale level c2 are next to each other in a direction of its pixel column. Moreover, on the opposite side of the correction-target bright pixel group Pix1 relative to the correction-target dark pixel group Pix2, dark pixels which are not of the correction-target dark pixel group Pix2 are successive. This dark pixel group is hereinafter referred to as “next dark pixel group Pix3" for distinguishing from the correction-target dark pixel group Pix2. The gray-scale level of each pixel (third pixel) of the next dark pixel group Pix3 is included in the gray-scale range a.

Originally, the position of a boundary to be perceived by a user is only a boundary B1. However, by performing the gray-scale correction for reducing reverse tilt domains, the gray-scale level of the correction-target dark pixel group Pix2 is higher than that of the next dark pixel group Pix3, and therefore, also a boundary B2 may be perceived by a user.

Therefore, in the video processing circuit 30 of the third embodiment, a boundary correction described below is performed for making a boundary which should not be originally viewed unnoticeable.

A. Boundary Correction on Correction-target Dark Pixel Group

A boundary correction on the correction-target dark pixel group Pix2 will be first described.

Figure 11B:
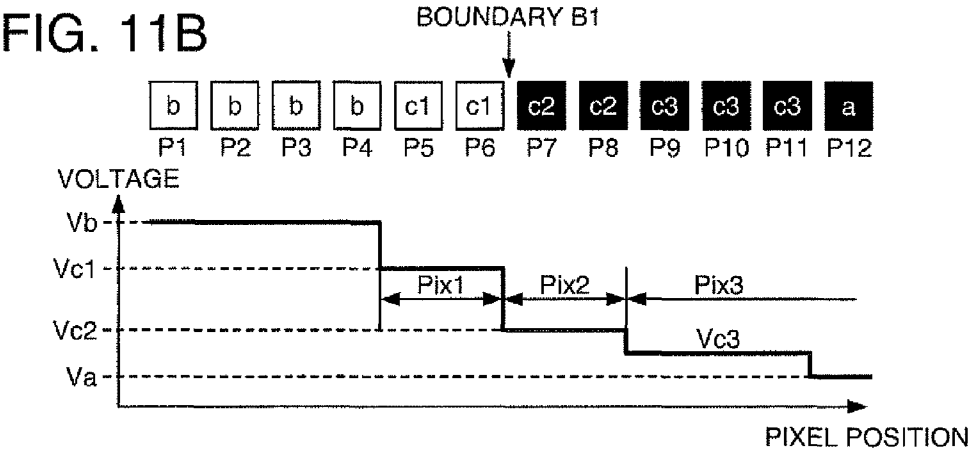

As shown in FIG. 11B, in the video processing circuit 30, the gray-scale level of each pixel of the next dark pixel group Pix3 is increased such that the gray-scale level of the next dark pixel group Pix3 does not exceed the gray-scale level of the correction-target dark pixel group Pix2. This gray-scale level can be realized by correcting and outputting the gray-scale level by the calculation unit 318. In this case, the gray-scale level of each of pixels P9 to P11 of the next dark pixel group Pix3 is corrected from a to c3 (a<c3<c2). An applied voltage to the liquid crystal element 120 for obtaining the gray-scale level c3 is Vc3. The voltage Vc3 is an applied voltage which exceeds the voltage Va and is below the voltage Vc2. Due to the correction of the applied voltage, the gray-scale level of the next dark pixel group Pix3 lies between the gray-scale level "c1" of the correction-target dark pixel group Pix2 and the gray-scale level "a". Therefore, compared to a case where the boundary correction is not performed, the boundary B2 between the pixels P8 and P9 is unlikely to be visible.

Figure 11C:
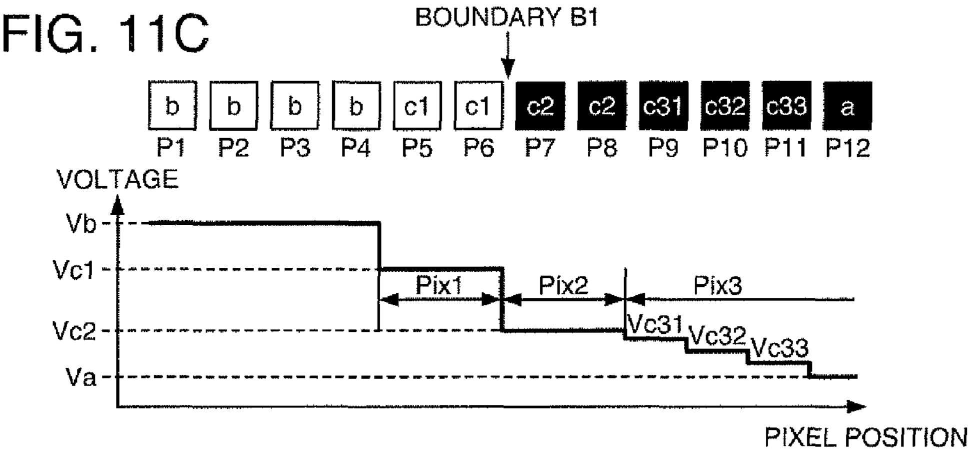

As shown in FIG. 11C, in the video processing circuit 30, the gray-scale levels of the pixels of the next dark pixel group Pix3 may not be the same each other, but the gray-scale level of the pixel may be progressively increased as the pixel approaches the boundary B2. In this case, the gray-scale level of the pixel P11 is set to c33, the gray-scale level of the pixel P10 is set to c32, and the gray-scale level of the pixel P9 is set to c31. Thus, it is possible to make the boundary B2 more unnoticeable.

On the opposite side of the boundary B1 relative to the correction-target bright pixel group Pix1 at the gray-scale level c1, bright pixels which are not of the correction-target bright pixel group Pix1 are successive. This bright pixel group is hereinafter referred to as "next bright pixel group Pix4" for distinguishing from the correction-target bright pixel group Pix1. The gray-scale level of each pixel (fourth pixel) of the next bright pixel group Pix4 is included in the gray-scale range b. In this case, since the gray-scale level of the correction-target bright pixel group Pix1 is lower than that of the next bright pixel group Pix4, a boundary B3 shown in FIG. 12A may be perceived by a user.

Therefore, in the video processing circuit 30, a boundary correction described below may be performed for making the boundary B3 unnoticeable.

B. Boundary Correction on Correction-target Bright Pixel Group

Figure 12A:
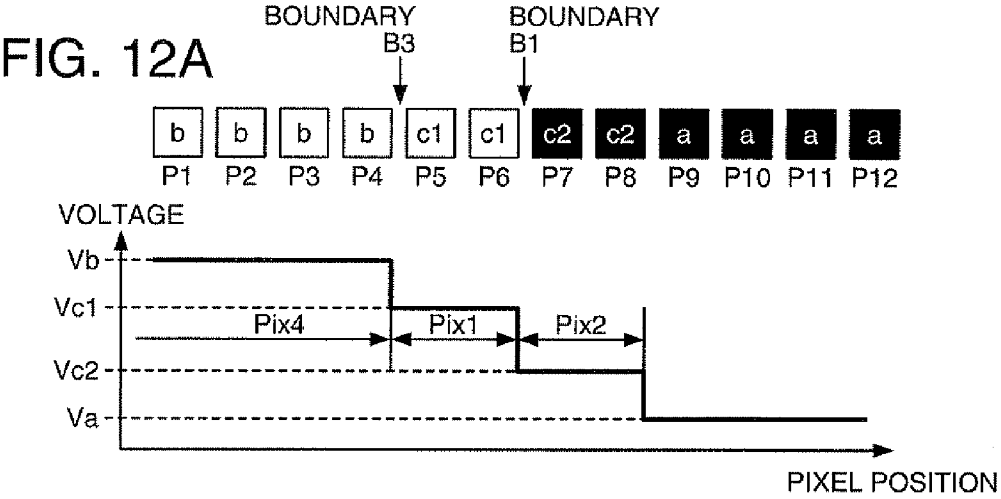
FIGS. 12A to 12C show the contents of another boundary correction according to the third embodiment.
Figure 12B:
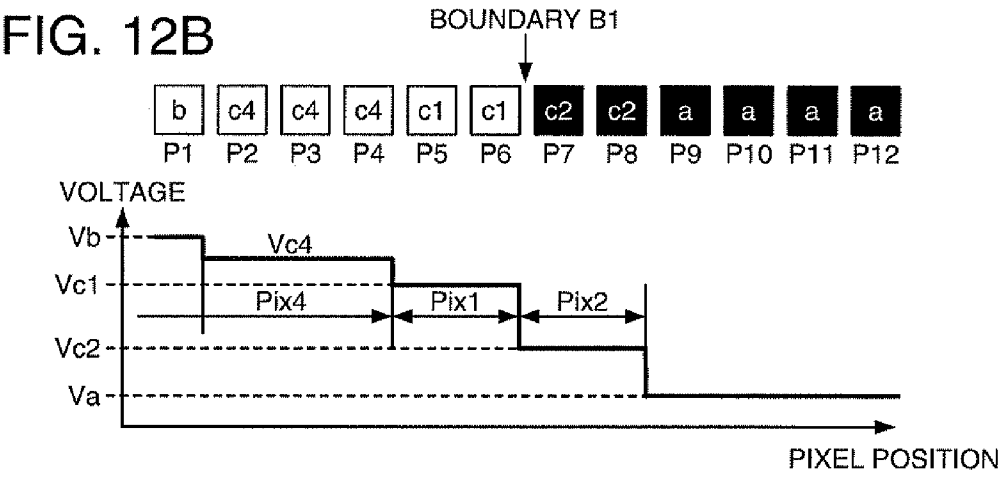

As shown in FIG. 12B, in the video processing circuit 30, the gray-scale level of each pixel of the next bright pixel group Pix4 is lowered such that the gray-scale level of the next bright pixel group Pix4 is not below the gray-scale level of the correction-target bright pixel group Pix1. In this case, the gray-scale level of each of pixels P2 to P4 of the next bright pixel group Pix4 is corrected from b to c4 (c1<c4<b). An applied voltage to the liquid crystal element 120 for obtaining the gray-scale level c4 is Vc4. The voltage Vc4 is an applied voltage which is below the voltage Vb and exceeds Vc1. Due to the correction of the applied voltage, the gray-scale level of the next bright pixel group Pix4 lies between the gray-scale level "c1" of the correction-target bright pixel group Pix1 and the gray-scale level "b". Therefore, compared to a case where the boundary correction is not performed, the boundary B3 between the pixels P4 and P5 is unlikely to be visible.

Figure 12C:
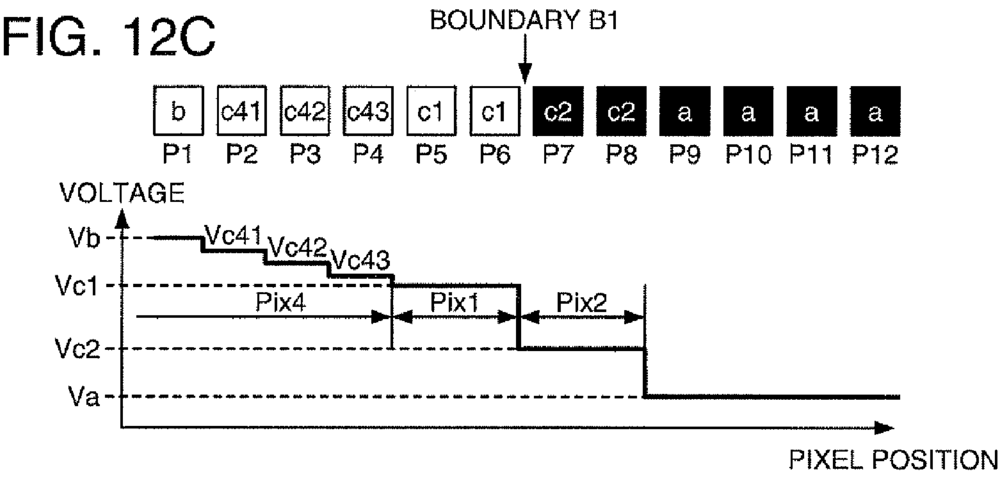

As shown in FIG. 12C, in the video processing circuit 30, the gray-scale levels of the pixels of the next bright pixel group Pix4 may not be the same each other, but the gray-scale level of the pixel may be progressively decreased as the pixel approaches the boundary B3. In this case, the gray-scale level of the pixel P2 is set to c41, the gray-scale level of the pixel P3 is set to c42, and the gray-scale level of the pixel P4 is set to c43. Thus, it is possible to make the boundary B3 more unnoticeable.

The boundary correction on the correction-target bright pixel group may be realized by providing the video processing circuit 30 of the second embodiment with the calculation unit 318.

C. Correction on Correction-target Dark Pixel Group and on Correction-Target Bright Pixel Group In the video processing circuit 30, both corrections corresponding to "A. Boundary correction on correction-target dark pixel group" described with reference to FIGS. 11A to 11C and "B. Boundary correction on correction-target bright pixel group" described with reference to FIGS. 12A to 12C may be performed. Thus, it is possible to make both the boundaries B2 and B3 unnoticeable.

In the boundary correction, each group of dark pixels and bright pixels whose gray-scale levels are corrected is defined as three successive pixels in this case. However, the number of pixels may be other than three. As an example, when the number of pixels is set to from one to six, a sufficient effect of the boundary correction is provided.

The boundary correction of the third embodiment may be performed as follows.

Figure 13A:
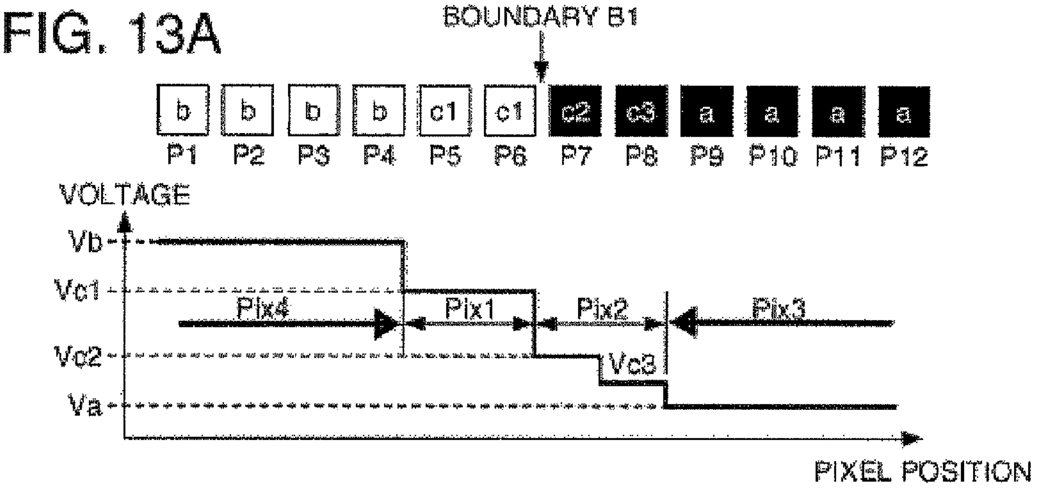
FIGS. 13A and 13B show the contents of still another boundary correction according to the third embodiment.
Figure 13B:
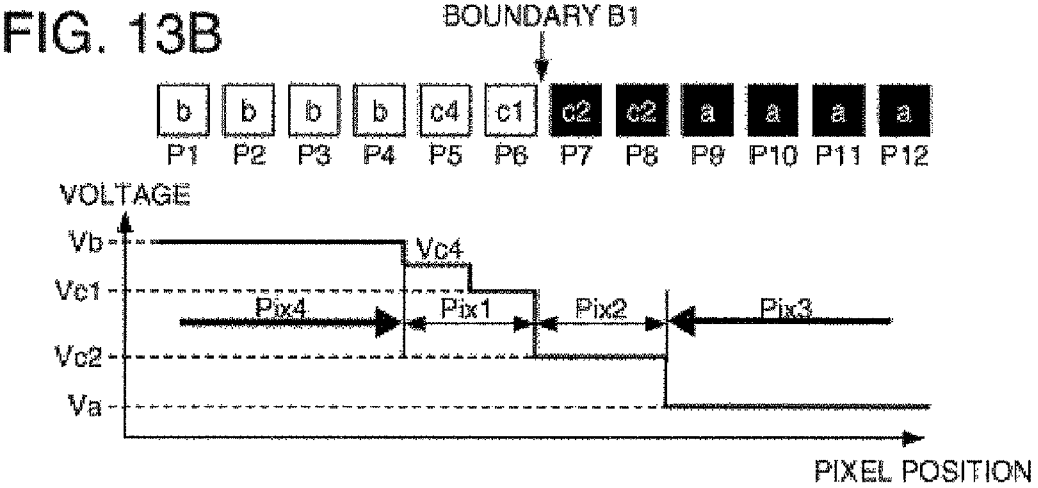

In an example shown in FIG. 13A, the video processing circuit 30 changes the gray-scale level of the correction-target dark pixel group Pix2, but does not change the gray-scale level of the next dark pixel group Pix3. Specifically, the video processing circuit 30 sets the gray-scale level of the pixel P8 to the gray-scale level c3 which is higher than that of the next dark pixel group Pix3 and lower than the gray-scale level c2. Also in this case, since the difference in gray-scale level (difference in applied voltage) between the pixels P8 and P9, which are pixels next to each other, is reduced, it is possible to make the boundary B2 unperceivable to a user. Moreover as shown in FIG. 13B, the video processing circuit 30 may change the gray-scale level of the correction-target bright pixel group Pix1, but may not change the gray-scale level of the next bright pixel group Pix4. Specifically, the video processing circuit 30 sets the gray-scale level of the pixel P5 to the gray-scale level c4 which is lower than that of the next bright pixel group Pix4 and higher than the gray-scale level c1. Also in this case, since the difference in gray-scale level between the pixels P4 and P5, which are pixels next to each other, is reduced, it is possible to make the boundary B3 unperceivable to a user.

In this manner, the video processing circuit 30 performs a correction such that the difference in gray-scale level (that is, potential difference) between a pixel group whose gray-scale level is corrected for reducing reverse tilt domains and a pixel group which is next to that pixel group on the opposite side to a boundary is reduced, whereby it is possible to prevent the boundary which is not originally present from being viewed.

MODIFIED EXAMPLES

Although, in the embodiments, the video signal Vid-in specifies the gray-scale level of a pixel, the video signal Vid-in may directly specify an applied voltage to a liquid crystal element. When the video signal Vid-in specifies the applied voltage to a liquid crystal element, a boundary may be determined based on a specified applied voltage to thereby correct a voltage.

In the embodiments, the gray-scale levels of pixels of the correction-target bright pixel group or the correction-target dark pixel group may not be the same.

In the embodiments, the liquid crystal element 120 is not limited to a transmissive one, but may be a reflective one. Further, the liquid crystal element 120 is not limited to the normally black mode, but may employ the normally white mode, as described above.

Also in the third embodiment, the normally white mode where the liquid crystal element 120 is in a white state when no voltage is applied may be employed with the TN-mode liquid crystal 105, for example. Also in this case, in the video processing circuit 30, an applied voltage to liquid crystal elements corresponding to a next dark pixel group is increased so that the difference in applied voltage relative to liquid crystal elements corresponding to dark pixels of a correction-target dark pixel group which is next to the next dark pixel group is reduced, or an applied voltage to liquid crystal elements corresponding to a next bright pixel group is decreased so that the difference in applied voltage relative to liquid crystal elements corresponding to bright pixels of a correction-target bright pixel group which is next to the next bright pixel group is reduced.

Electronic Apparatus

Figure 14:
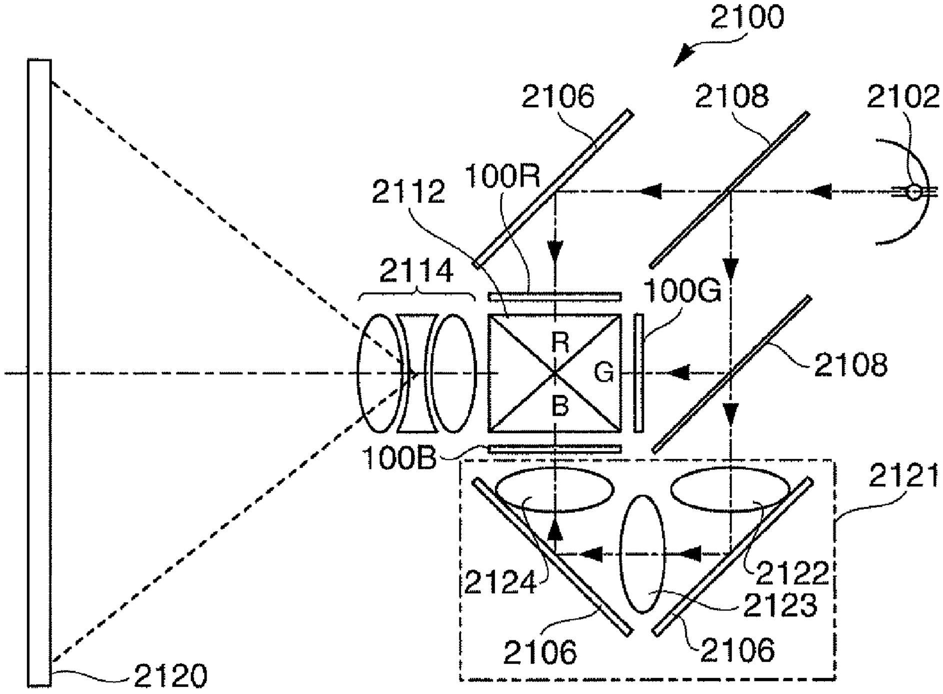
FIG. 14 shows a projector to which the liquid crystal display device according to any of the embodiments is applied.

As an example of an electronic apparatus using the liquid crystal display device according to any of the embodiments, a projection type display device (projector) using the liquid crystal panel 100 as a light valve will be next described. FIG. 14 is a plan view showing the configuration of the projector.

As shown in the drawing, a lamp unit 2102 including a white light source such as a halogen lamp is disposed inside the projector 2100. Projection light emitted from the lamp unit 2102 is separated into three primary colors of R (red) color, G (green) color, and B (blue) color through three mirrors 2106 and two dichroic mirrors 2108 arranged inside the projector, and the separated lights are guided to light valves 100R, 100G, and 100B corresponding to respective primary colors. Since the B-color light has an optical path longer than those of the R-color and G-color lights, the B-color light is guided through a relay lens system 2121 including an incident lens 2122, a relay lens 2123, and an exit lens 2124 for preventing optical loss.

In the projector 2100, three liquid crystal display devices each including the liquid crystal panel 100 are disposed so as to correspond to the respective R, G, and B colors. The configuration of each of the light valves 100R, 100G, and 100B is similar to that of the liquid crystal panel 100. Video signals which specify gray-scale levels of primary color components of respective colors of R, G, and B are supplied from an external higher-level circuit to drive the light valves 100R, 100G, and 100B.

Lights modulated respectively by the light valves 100R, 100G, and 100E are incident on a dichroic prism 2112 in three directions. In the dichroic prism 2112, the R-color and B-color lights are refracted at 90 degrees, while the G-color light goes straight. Accordingly, images of respective primary colors are combined, and then a color image is projected onto a screen 2120 by a projection lens 2114.

Since lights corresponding to the respective colors of R, G, and B are incident on the light valves 100R, 100G, and 100B by the dichroic mirrors 2108, there is no need to provide color filters. Transmission images of the light valves 100R and 100B are reflected by the dichroic prism 2112 and then projected, while a transmission image of the light valve 100G is projected as it is. Therefore, the horizontal scanning directions by the light valves 100R and 100B are opposite to the horizontal scanning direction by the light valve 100G to thereby display a mirror image.

Examples of electronic apparatuses include, in addition to the projector described with reference to FIG. 14, television sets, viewfinder-type/monitor direct-view-type video tape recorders, car navigation systems, pagers, electronic notebooks, calculators, word processors, workstations, videophone, POS terminals, digital still cameras, mobile phones, and apparatuses provided with a touch panel. The liquid crystal display device is of course applicable to the various electronic apparatuses.

The entire disclosure of Japanese Patent Application No. 2010-035770, filed Feb. 22, 2010 is expressly incorporated by reference herein.

What is claimed is:

1. A video processing circuit for a liquid crystal panel including a first substrate in which a pixel electrode is disposed corresponding to each of a plurality of pixels, a second substrate in which a common electrode is disposed, and liquid crystal interposed between the first substrate and the second substrate, the pixel electrode, the liquid crystal, and the common electrode constituting each of liquid crystal elements, the video processing circuit inputting a video signal which specifies an applied voltage to the liquid crystal element for each of the pixels and defining the applied voltage to each of the liquid crystal elements based on a processed video signal, the video processing circuit comprising:

a boundary detecting unit which detects a boundary between a first pixel whose applied voltage specified by an input video signal is below a first voltage and a second pixel whose applied voltage is equal to or higher than a second voltage which is higher than the first voltage; and a correction unit which corrects, for at least two pixels of a second plurality of pixels one of which is adjacent to the boundary detected by the boundary detecting unit on the opposite side of the first pixel and which are successive in a direction opposite to the boundary, an applied voltage to liquid crystal elements corresponding to the second plurality of pixels from the applied voltage specified by the video signal to a voltage which is equal to or higher than the first voltage and below the second voltage.

2. The video processing circuit according to claim 1, wherein the correction unit corrects, for at least two pixels of a first plurality of pixels one of which is adjacent to the boundary detected by the boundary detecting unit on the opposite side of the second pixel and which are successive in a direction opposite to the boundary, an applied voltage to liquid crystal elements corresponding to the first plurality of pixels from the applied voltage specified by the video signal to a voltage which is equal to or higher than the first voltage and below the applied voltage to the liquid crystal elements corresponding to the at least two pixels of the second plurality of pixels.

3. The video processing circuit according to claim 2, wherein the correction unit increases, for at least one third pixel which is next to the at least two pixels of the first plurality of pixels on the opposite side of the boundary, whose applied voltage specified by the video signal is below the first voltage, and which is successive in the direction opposite to the boundary, an applied voltage to a liquid crystal element corresponding to the at least one third pixel so that a difference between the applied voltages to liquid crystal elements corresponding to the third pixel and the first pixel next to each other is reduced.

4. The video processing circuit according to claim 1, wherein the correction unit decreases, for at least one fourth pixel which is next to the at least two pixels of the second plurality of pixels on the opposite side of the boundary, whose applied voltage specified by the video signal is equal to or higher than the second voltage, and which is successive in the direction opposite to the boundary, an applied voltage to a liquid crystal element corresponding to the at least one fourth pixel so that a difference between the applied voltages to liquid crystal elements corresponding to the fourth pixel and the second plurality of pixels next to each other is reduced.

5. A video processing method for a liquid crystal panel including a first substrate in which a pixel electrode is disposed corresponding to each of a plurality of pixels, a second substrate in which a common electrode is disposed, and liquid crystal interposed between the first substrate and the second substrate, the pixel electrode, the liquid crystal, and the common electrode constituting each of liquid crystal elements, the video processing method being for inputting a video signal which specifies an applied voltage to the liquid crystal element for each of the pixels and defining the applied voltage to each of the liquid crystal elements based on a processed video signal, the video processing method comprising:

detecting a boundary between a first pixel Whose applied voltage specified by an input video signal is below a first voltage and a second pixel whose applied voltage is equal to or higher than a second voltage which is higher than the first voltage; and correcting, for at least two pixels of a second plurality of pixels one of which is adjacent to the detected boundary on the opposite side of the first pixel and which are successive in a direction opposite to the boundary, an applied voltage to liquid crystal elements corresponding to the second plurality of pixels from the applied voltage specified by the video signal to a voltage which is equal to or higher than the first voltage and below the second voltage.

6. The video processing method according to claim 5, further comprising:

correcting, for at least two first pixels one of which is adjacent to the detected boundary on the opposite side of the second pixel and which are successive in the direction opposite to the boundary, an applied voltage to liquid crystal elements corresponding to the first pixels from the applied voltage specified by the video signal to a voltage which is equal to or higher than the first voltage and below the applied voltage to the liquid crystal elements corresponding to the at least two second pixels.

7. A liquid crystal display device comprising:

a liquid crystal panel including liquid crystal elements each of which has liquid crystal interposed between a pixel electrode disposed corresponding to each of a plurality of pixels in a first substrate and a common electrode disposed in a second substrate; and the video processing circuit according to claim 1.

8. A liquid crystal display device comprising:

a liquid crystal panel including liquid crystal elements each of which has liquid crystal interposed between a pixel electrode disposed corresponding to each of a plurality of pixels in a first substrate and a common electrode disposed in a second substrate; and the video processing circuit according to claim 2.

9. A liquid crystal display device comprising:

a liquid crystal panel including liquid crystal elements each of which has liquid crystal interposed between a pixel electrode disposed corresponding to each of a plurality of pixels in a first substrate and a common electrode disposed in a second substrate; and the video processing circuit according to claim 3.

10. A liquid crystal display device comprising:

a liquid crystal panel including liquid crystal elements each of which has liquid crystal interposed between a pixel electrode disposed corresponding to each of a plurality of pixels in a first substrate and a common electrode disposed in a second substrate; and the video processing circuit according to claim 4.

11. An electronic apparatus comprising the liquid crystal display device according to claim 7.

12. An electronic apparatus comprising the liquid crystal display device according to claim 8.

13. An electronic apparatus comprising the liquid crystal display device according to claim 9.

14. An electronic apparatus comprising the liquid crystal display device according to claim 10.

* * * * *